(12) United States Patent
Hand

(10) Patent No.: US 12,543,614 B2
(45) Date of Patent: Feb. 10, 2026

(54) ROBOTIC WEED REMOVAL SYSTEM FOR AESTHETIC MULCH GARDENS

(71) Applicant: Emmet Edward Hand, Arlington, VA (US)

(72) Inventor: Emmet Edward Hand, Arlington, VA (US)

( * ) Notice: Subject to any disclaimer, the term of this patent is extended or adjusted under 35 U.S.C. 154(b) by 892 days.

(21) Appl. No.: 17/810,604

(22) Filed: Jul. 3, 2022

(65) Prior Publication Data

US 2024/0000001 A1    Jan. 4, 2024

(51) Int. Cl.
| | |
|---|---|
| *A01B 39/18* | (2006.01) |
| *B25J 9/12* | (2006.01) |
| *B25J 9/16* | (2006.01) |
| *B25J 11/00* | (2006.01) |
| *B25J 19/02* | (2006.01) |

(52) U.S. Cl.
CPC .............. *A01B 39/18* (2013.01); *B25J 9/12* (2013.01); *B25J 9/1666* (2013.01); *B25J 11/005* (2013.01); *B25J 19/023* (2013.01)

(58) Field of Classification Search
CPC . A01B 39/18; B25J 9/12; B25J 9/1666; B25J 11/005; B25J 19/023
See application file for complete search history.

(56) References Cited

U.S. PATENT DOCUMENTS

| | | | |
|---|---|---|---|
| 4,223,313 A * | 9/1980 | Chabrol | B25J 17/0241 340/870.07 |
| 5,606,821 A | 3/1997 | Sadjadi | |
| 6,595,298 B1 | 7/2003 | Crady | |
| 7,854,108 B2 | 12/2010 | Koselka | |

(Continued)

FOREIGN PATENT DOCUMENTS

| | | |
|---|---|---|
| CN | 1017079928 | 5/2010 |
| CN | 111109237 A | 5/2020 |

(Continued)

OTHER PUBLICATIONS

Slaughter, D. C., Giles, D. K., Downey, D.: "Autonomous Robotic Weed Control Systems: A Review." J. Computers & Electronics in Agraculture; v. 61, pp. 63-78, Elsevier, (2008).

*Primary Examiner* — Harry Y Oh
(74) *Attorney, Agent, or Firm* — Charles Alexander Garris, Jr.

(57) ABSTRACT

An apparatus and method for removing weeds from an aesthetic mulch garden using an autonomous battery-powered differential-wheeled robot is disclosed. The boundary of the domain of said aesthetic mulch garden is predefined by the user and said robot is confined to patrol within said domain. The robot searches for weeds using machine vision which seeks colorimetric contrast between weeds and mulch and undergoes a novel randomized reflective trajectory to patrol said domain. An independent collision avoidance system allows said robot to avoid interaction with non-weed objects. Said robot has a central processing unit (CPU) receiving input from said machine vision system which positions a device for weed extraction and controls said extraction. A built-in suction system and receptacle is incorporated in said robot to maintain the weed extraction device clean and ready for operation while storing extracted weeds for later disposal.

20 Claims, 17 Drawing Sheets

(3 of 17 Drawing Sheet(s) Filed in Color)

Mulch garden weed control robot -side view

(56) References Cited

U.S. PATENT DOCUMENTS

| | | | |
|---|---|---|---|
| 8,930,095 B2 | 1/2015 | Anderson | |
| 9,596,840 B1 | 3/2017 | Bourquin | |
| 10,681,905 B2 | 6/2020 | Tanner | |
| 10,701,852 B2 | 7/2020 | Calleija | |
| 11,464,161 B1 * | 10/2022 | Phanco | A01D 75/185 |
| 2011/0153172 A1 * | 6/2011 | Anderson | A01D 34/008 |
| | | | 701/50 |
| 2018/0153084 A1 * | 6/2018 | Calleija | A01B 79/005 |
| 2021/0105995 A1 * | 4/2021 | Palomares | A01B 39/18 |
| 2022/0183208 A1 * | 6/2022 | Sibley | G06V 20/56 |
| 2022/0183209 A1 * | 6/2022 | Scott-Robinson | G05D 1/0225 |
| 2022/0394912 A1 * | 12/2022 | Barklund | A01M 21/02 |

FOREIGN PATENT DOCUMENTS

| | | |
|---|---|---|
| EP | 2848120 A1 | 3/2015 |
| ES | 2846786 | 1/2016 |

* cited by examiner

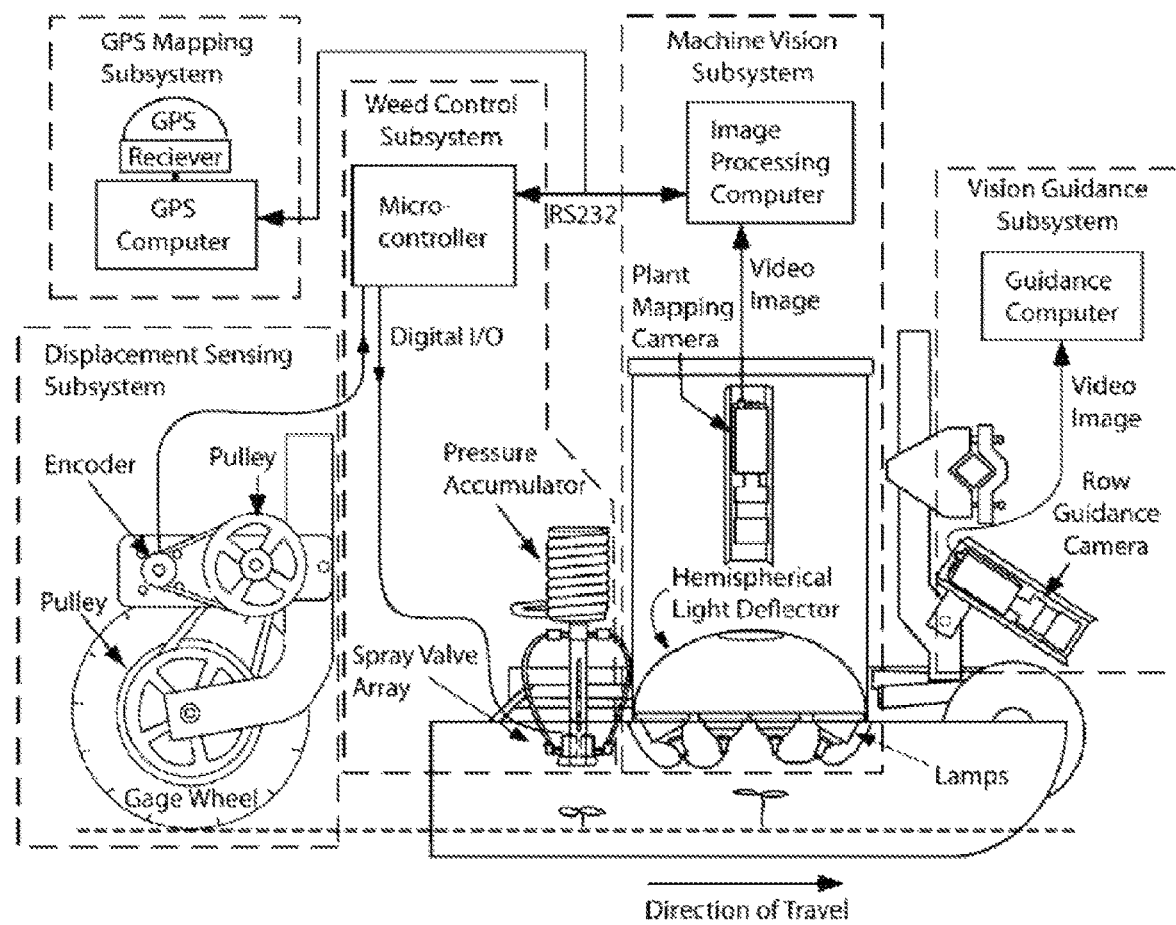
FIG. 1 – PRIOR ART
Agricultural autonomous intra-row weed control system [Slaughter et al. 2007]

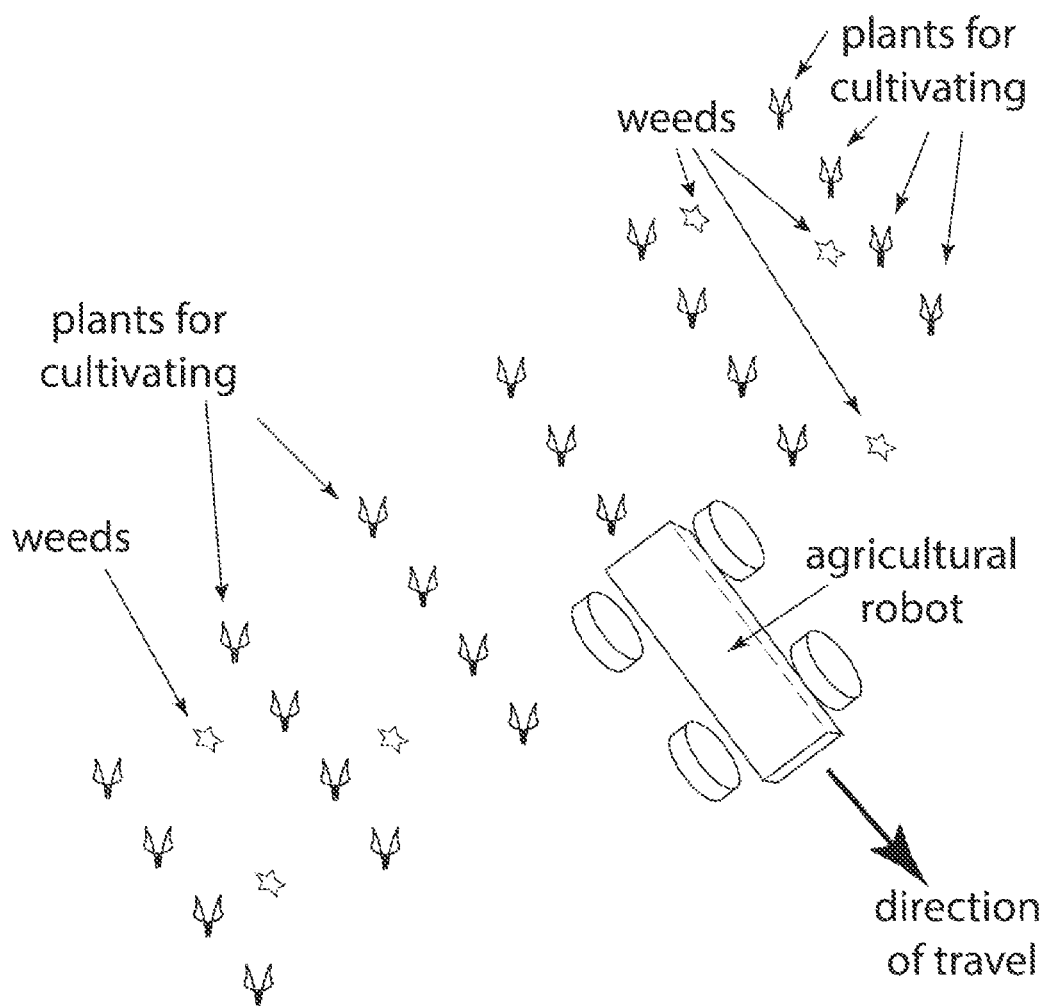
FIG. 2 - PRIOR ART - Trajectory of agricultural weed control robot by intra-row guidance.

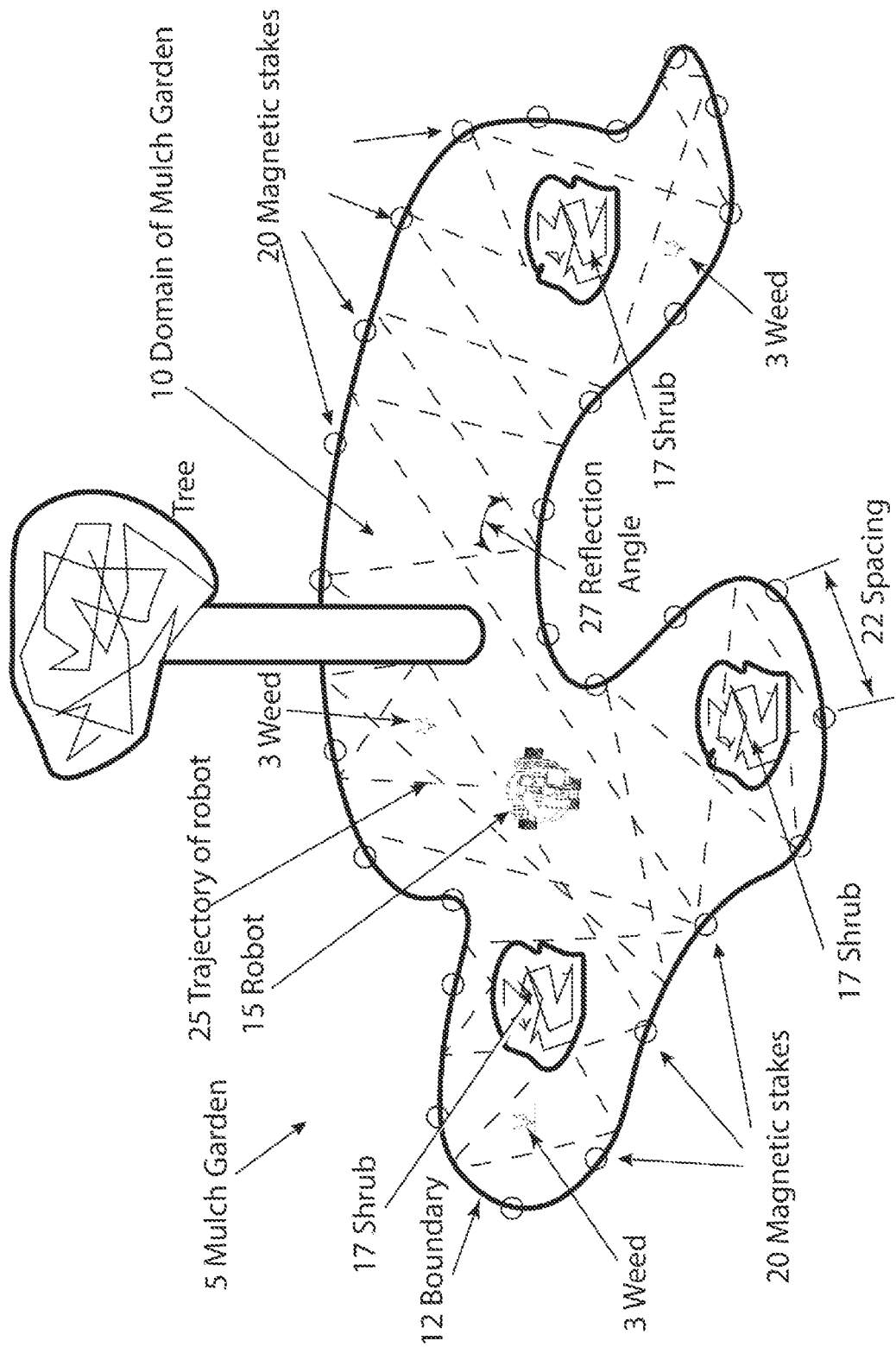
FIG. 3 – Trajectory of mulch garden weed control robot by reflective randomization

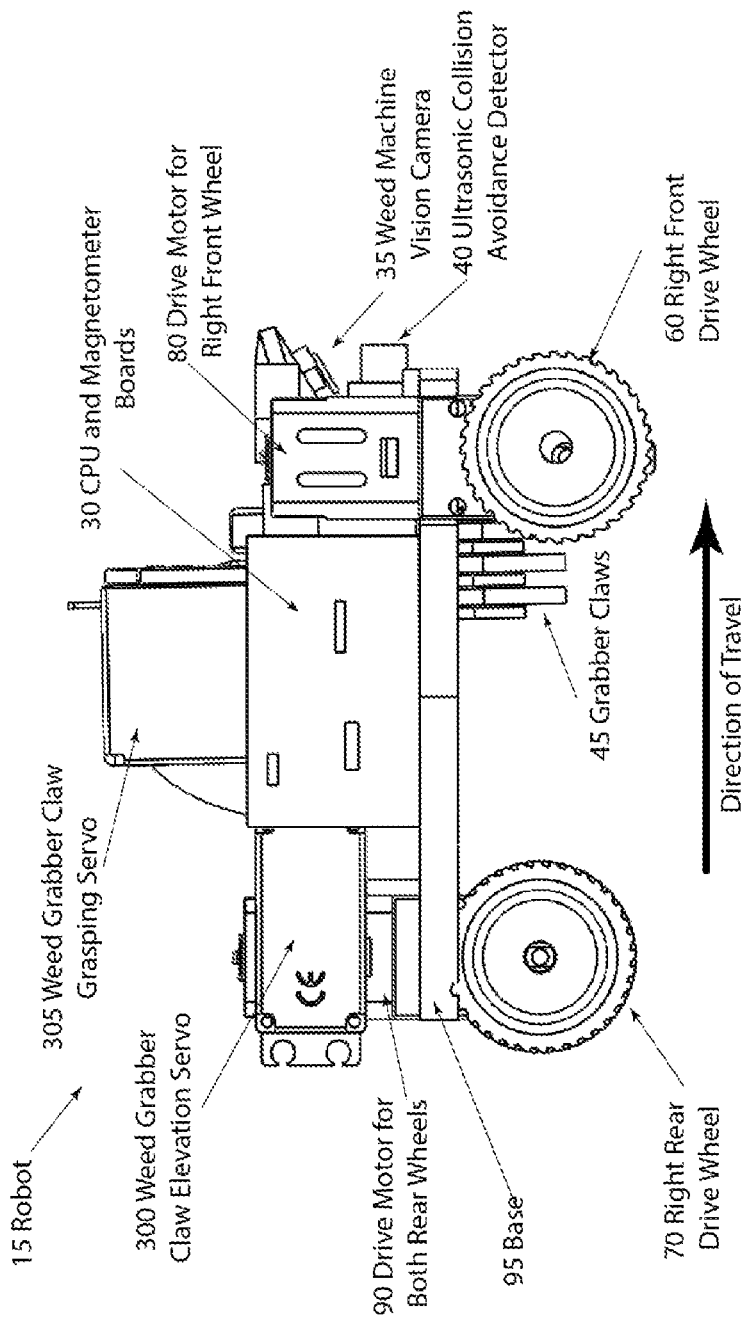
FIG. 4 – Mulch garden weed control robot - side view

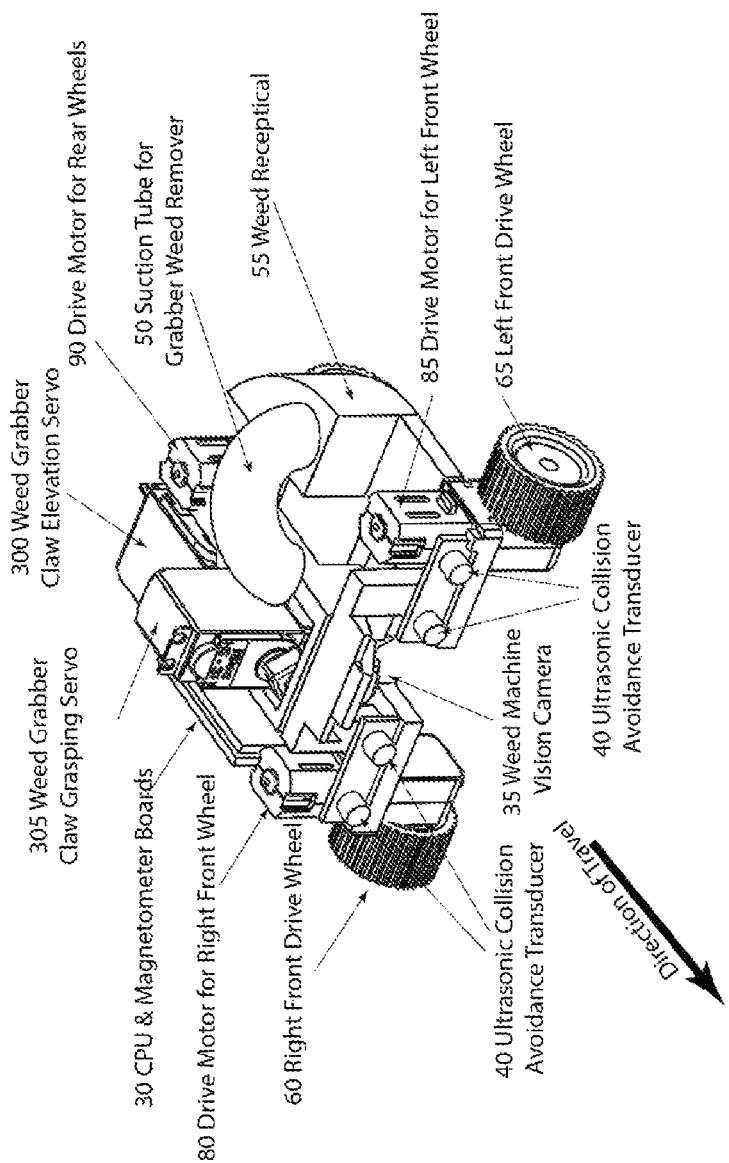
FIG. 5 - Mulch garden weed control robot - top orthographic view

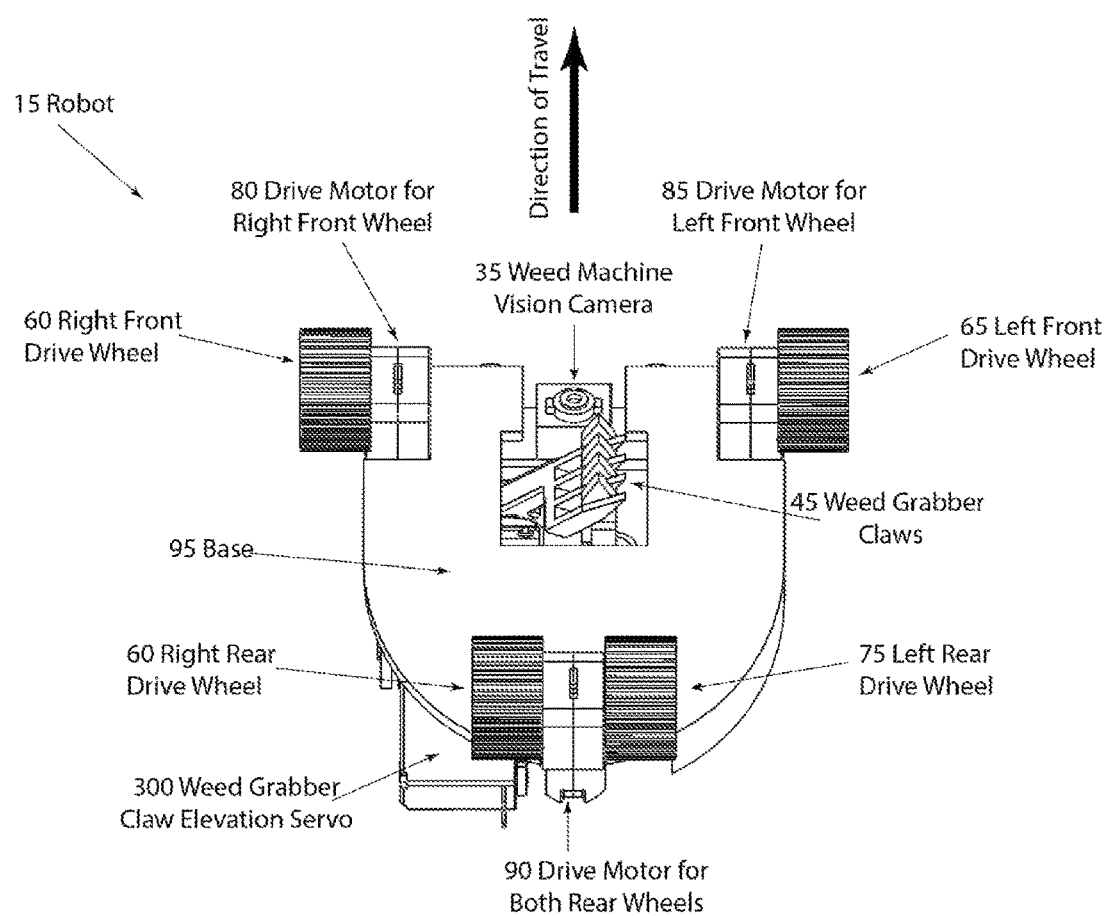
FIG. 6 - Mulch garden weed control robot - bottom orthographic view

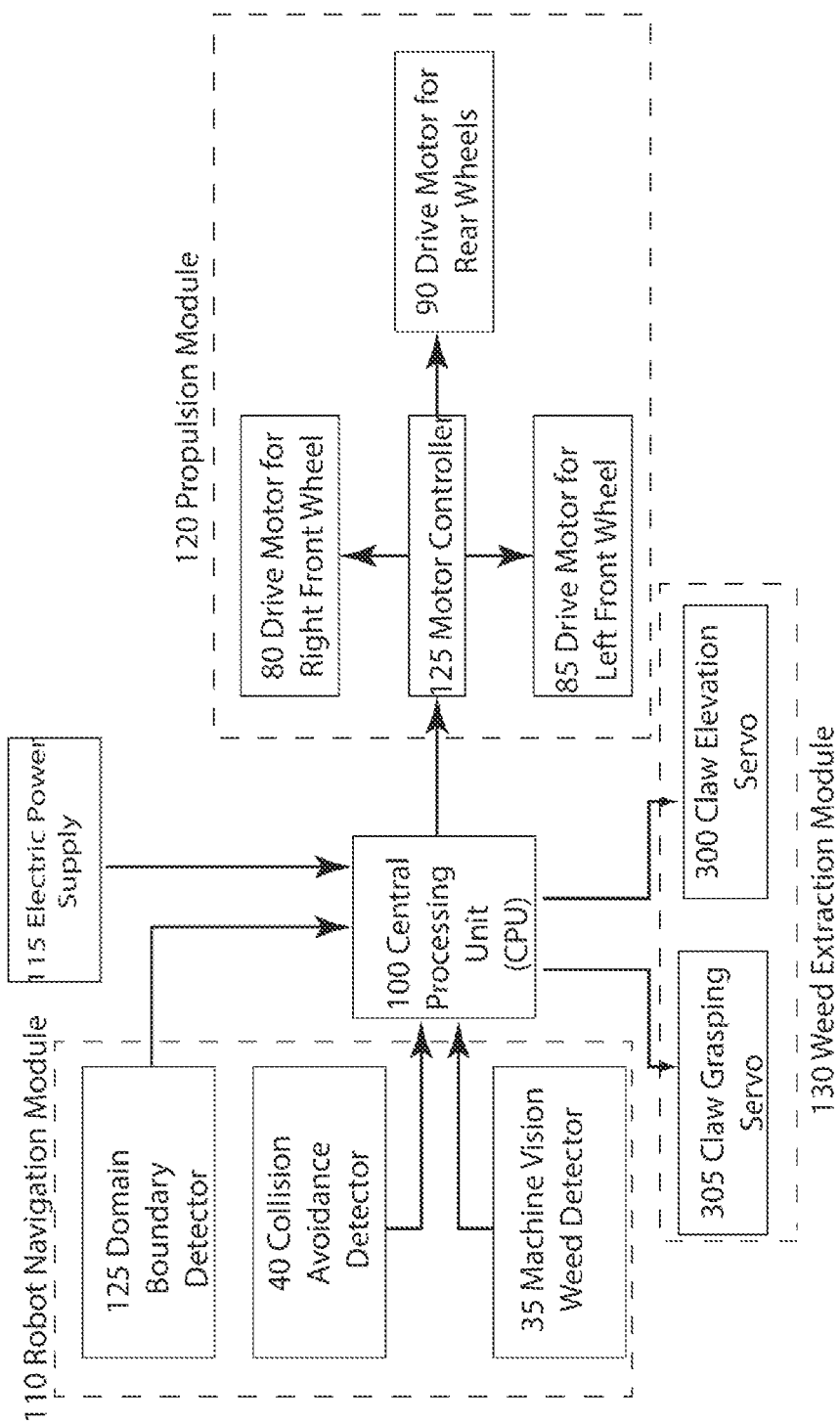
FIG. 7 – Control system for mulch garden weed control robot

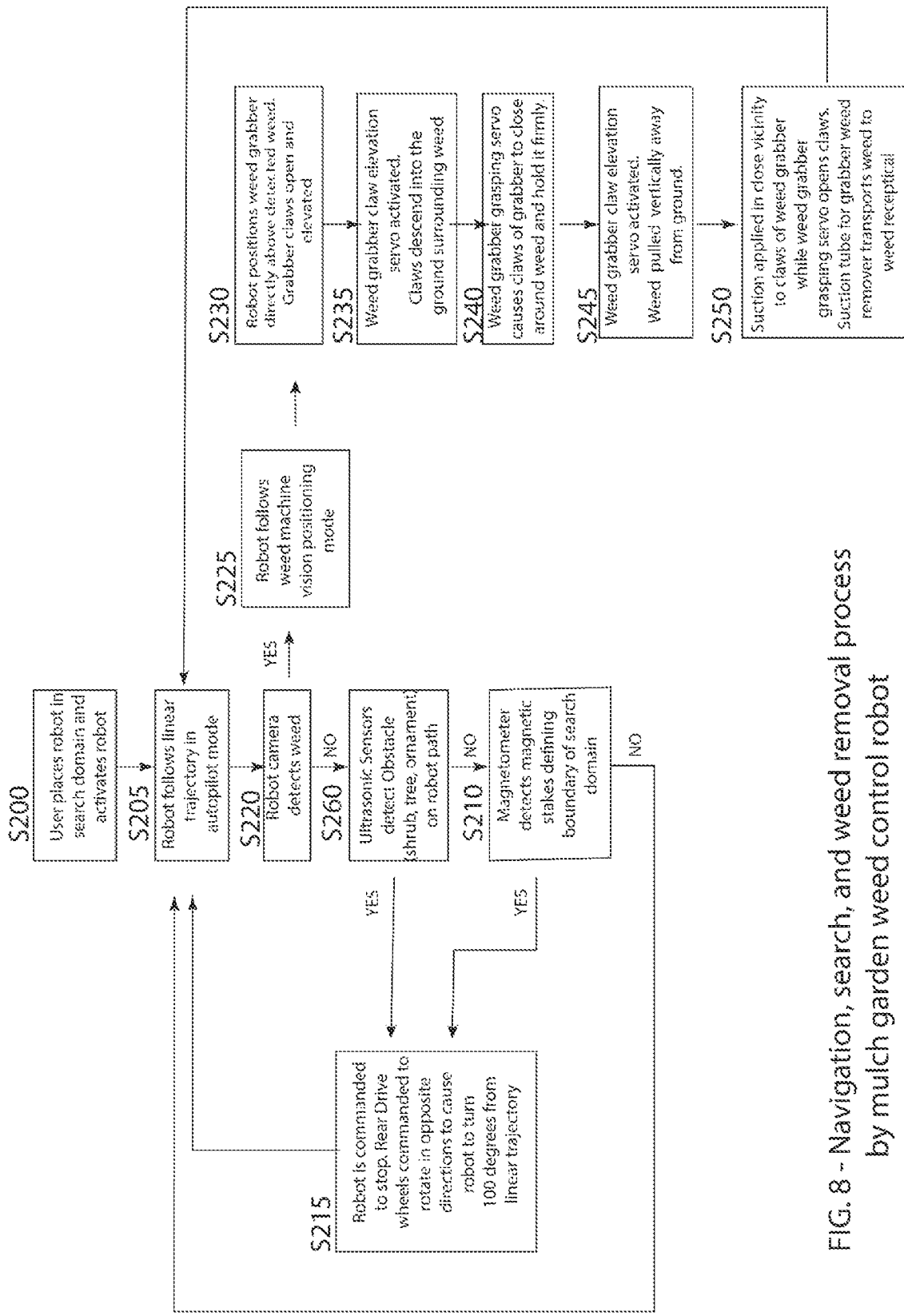
FIG. 8 - Navigation, search, and weed removal process by mulch garden weed control robot

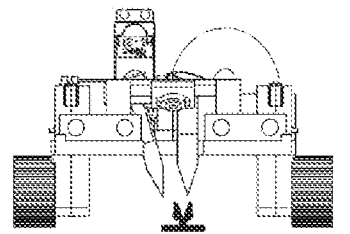
Machine vision positions robot above weed. Grabber claws open and retracted.  S230

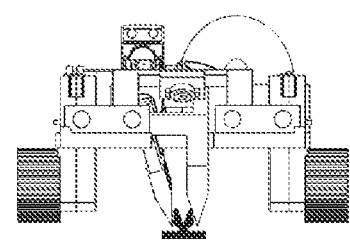
Grabber claws descend and surround weed.  S235

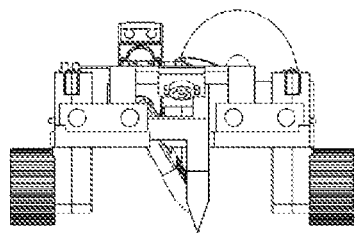
Grabber claws close and grasp weed.  S240

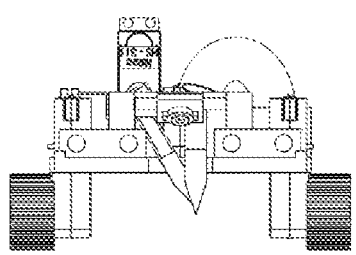
Grabber claws extract weed by pulling vertically.  S245

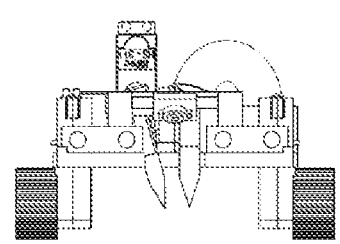
Suction tube cleans grabber while claws open. Unit returns to navigation mode and claws positioned to grab next weed.  S250

Robot follows linear trajectory in autopilot mode.  S205

FIG. 9 - Weed removal process with mulch garden weed control robot

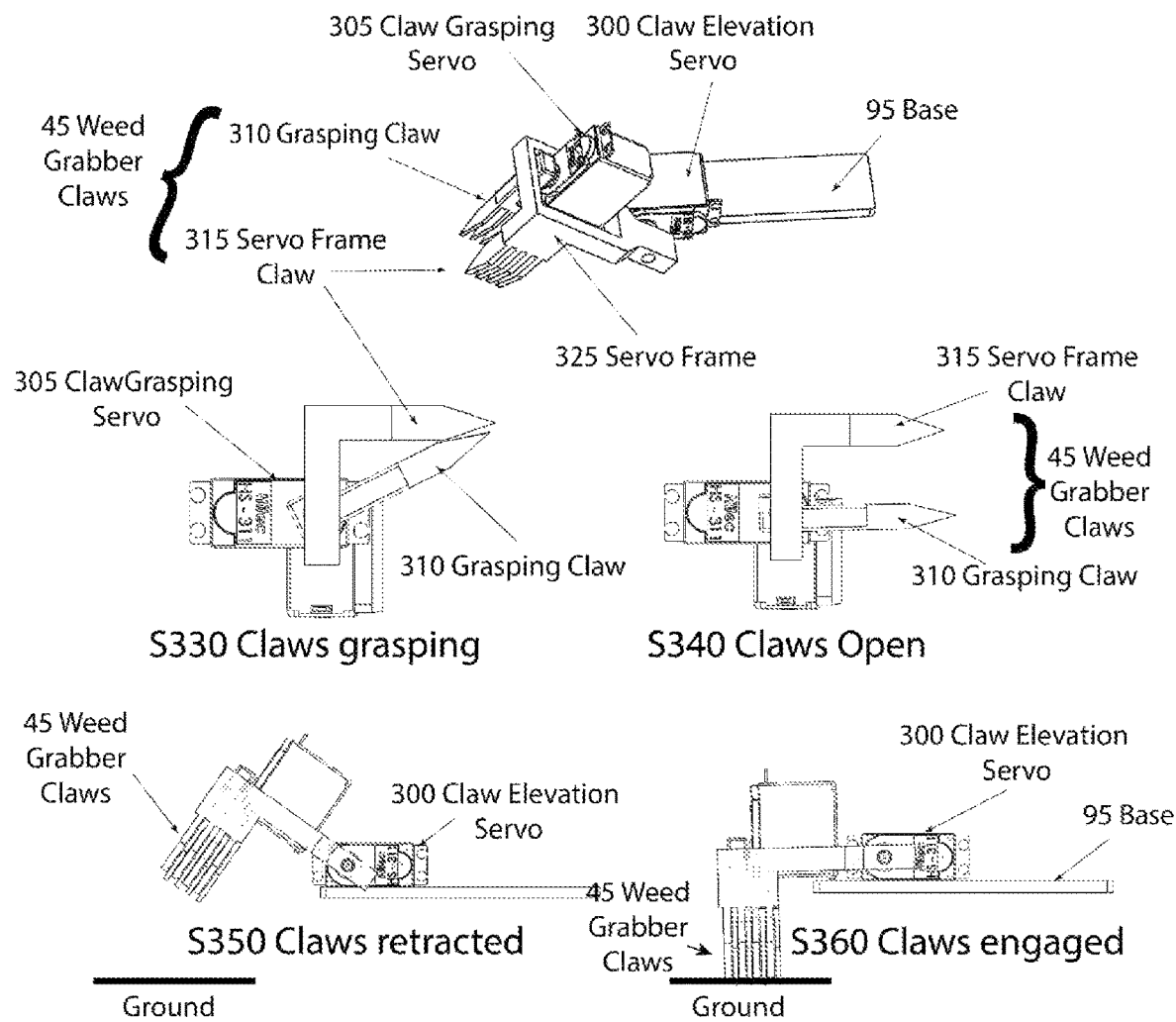
FIG. 10 - Servo operation in weed removal process

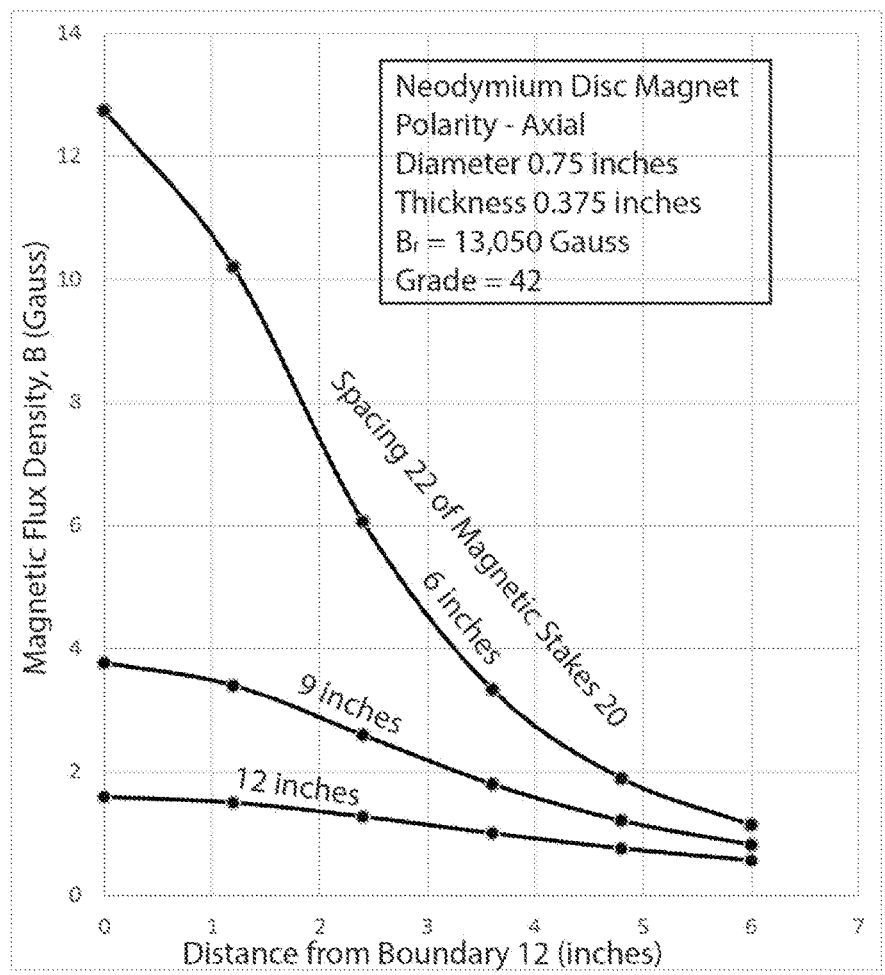
FIG. 11 - Sample Calculation of Spacing of Magnetic Stakes

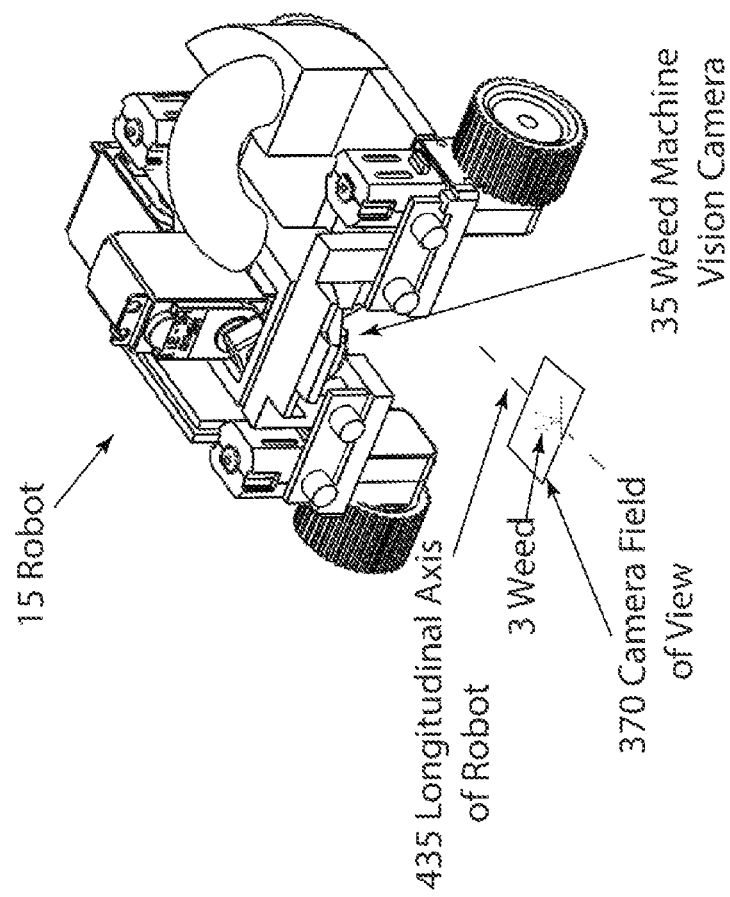
FIG. 12 - Machine Vision Camera Field of View

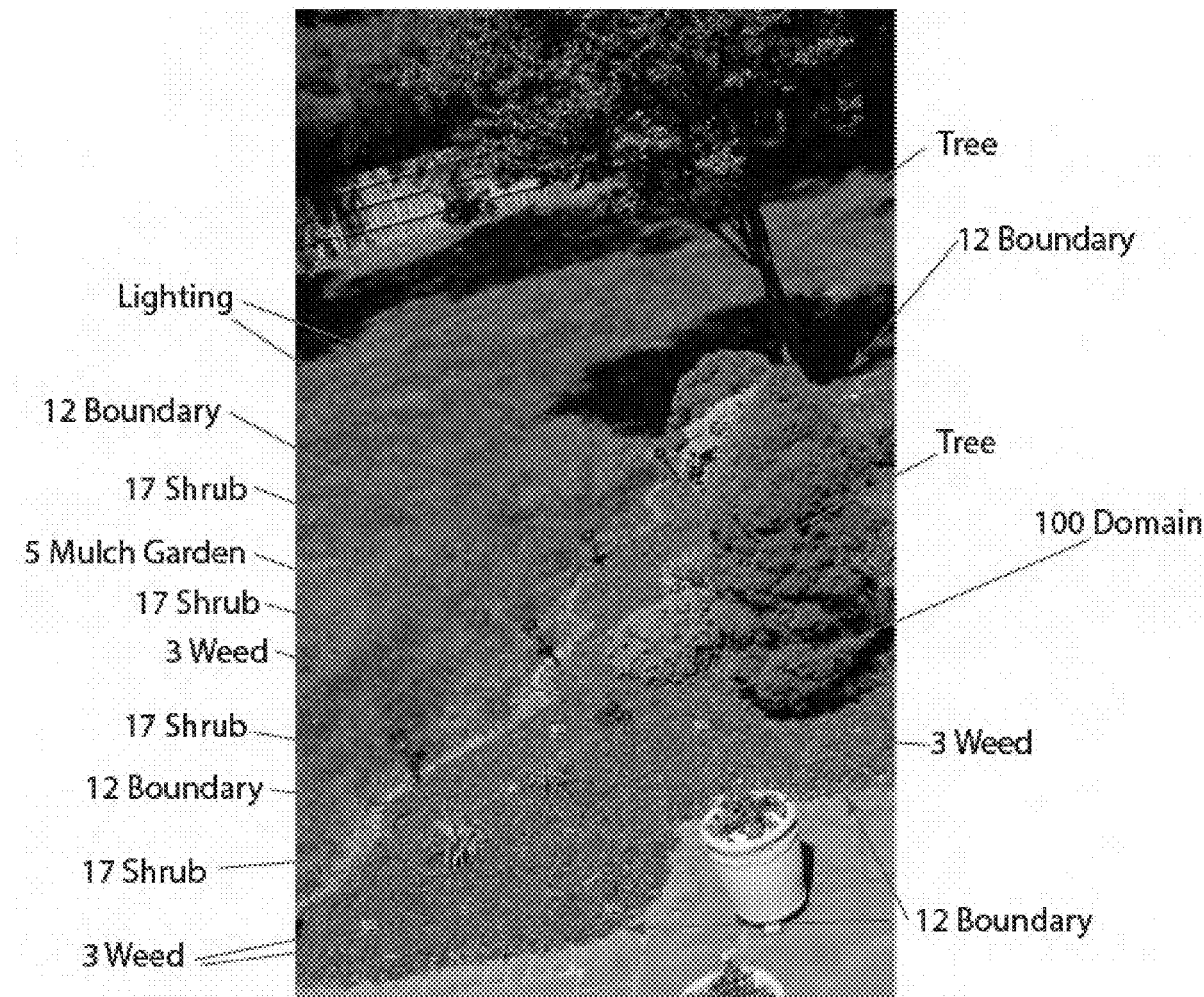
FIG. 13 - Photo of Mulch Garden

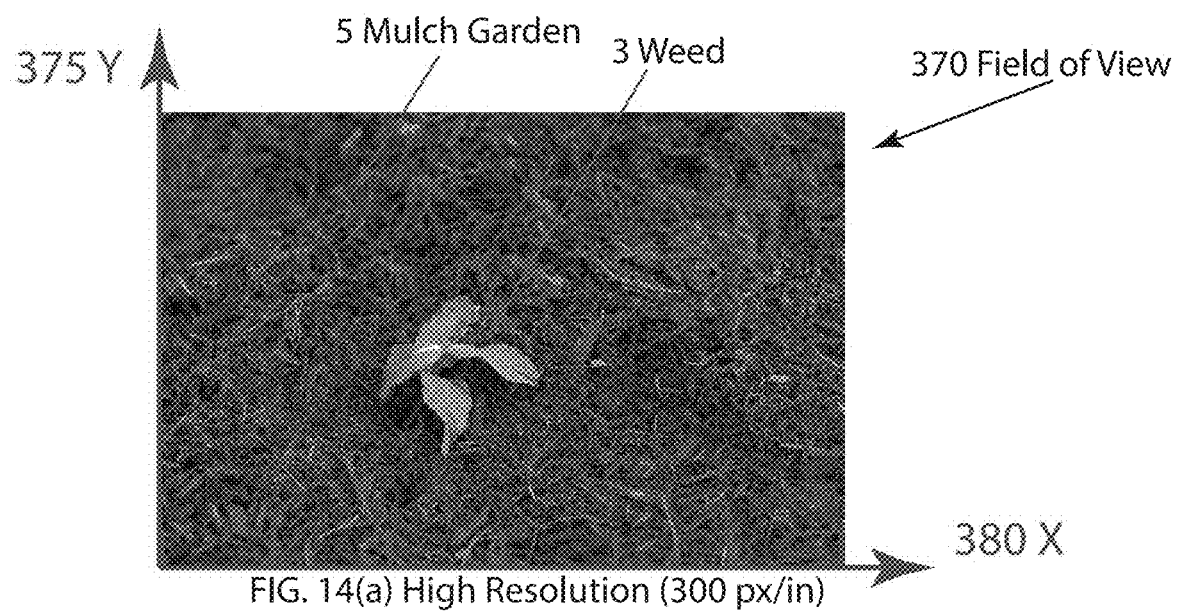
FIG. 14(a) High Resolution (300 px/in)
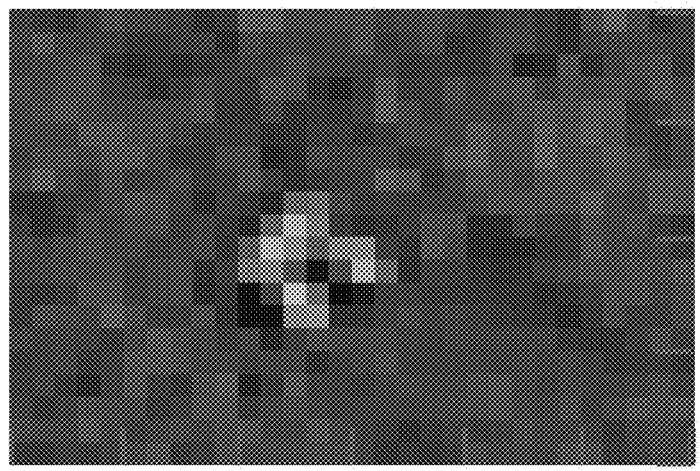
FIG. 14(b) Low Resolution (5 px/in)
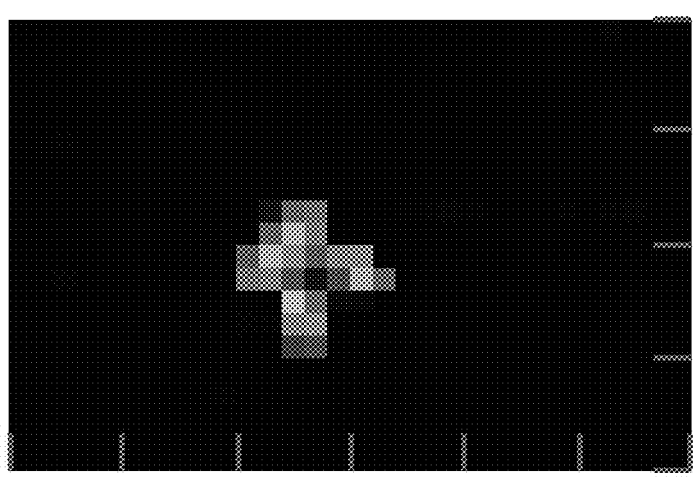
FIG. 14(c) Background RGB Data Erased

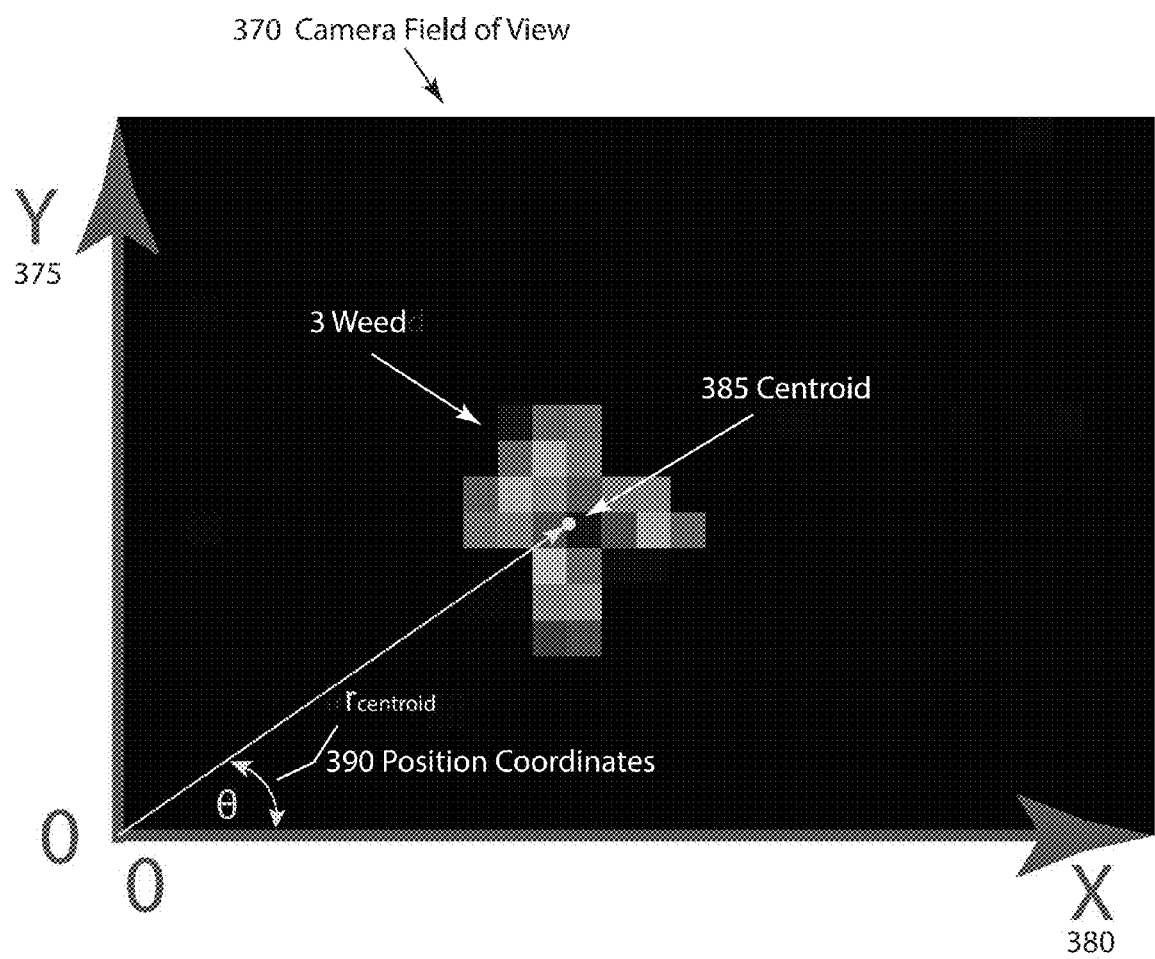
FIG. 15(a) - Field of View Coordinates of Weed Pixels

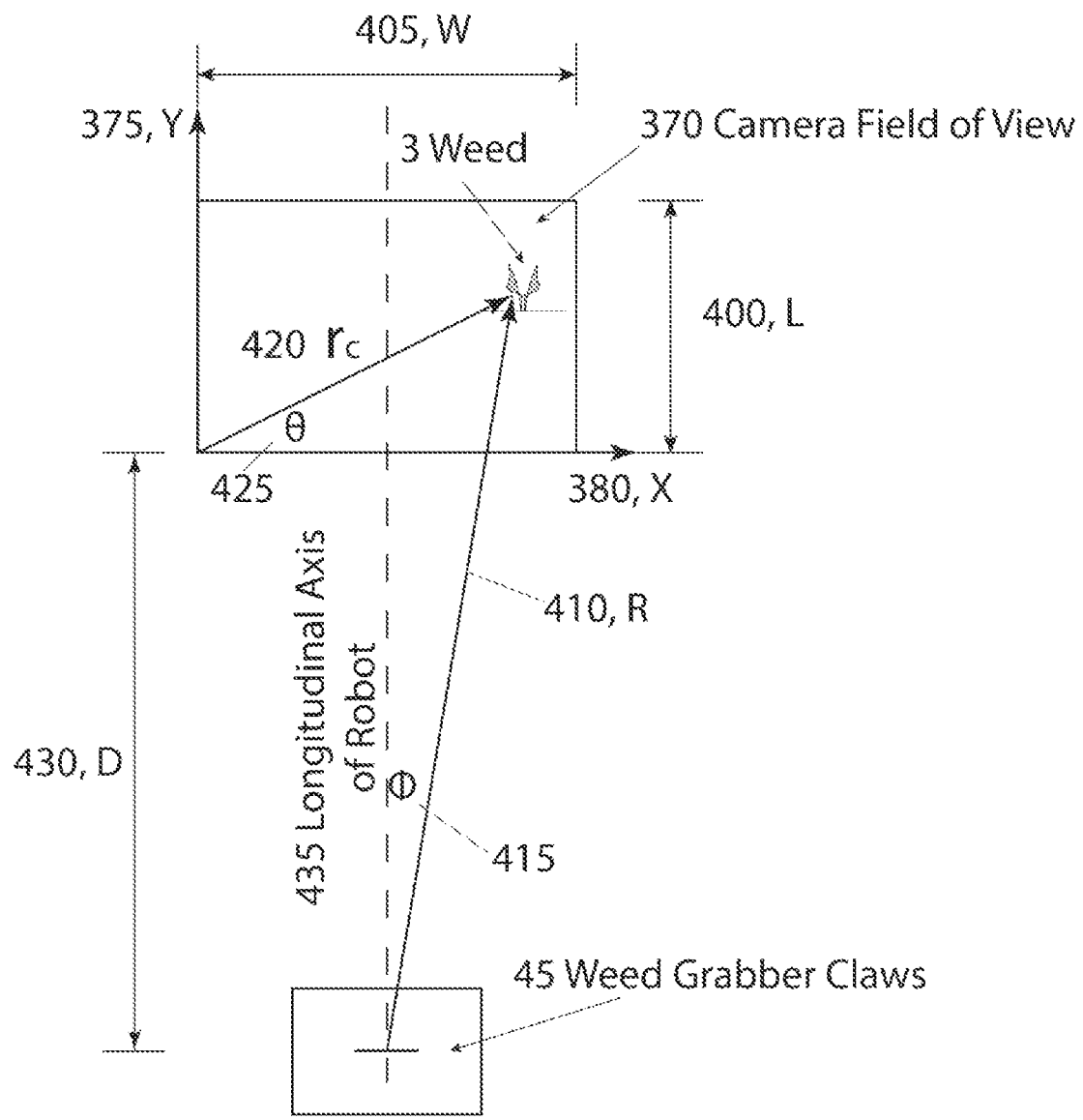
FIG. 15(b) - Robot Positioning Coordinates

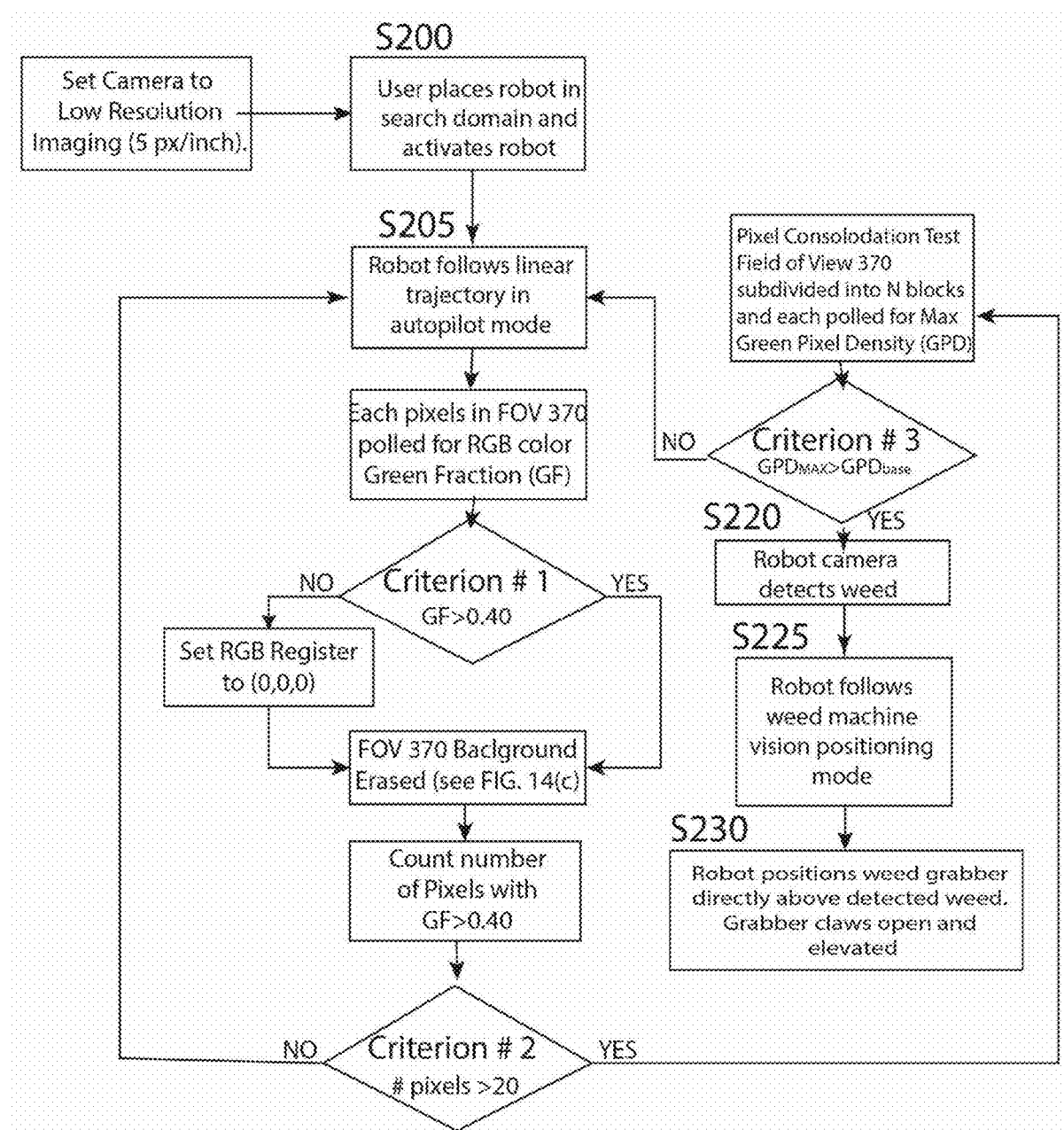
FIG. 16 - Machine Vision Weed Identification

ROBOTIC WEED REMOVAL SYSTEM FOR AESTHETIC MULCH GARDENS

FIELD OF THE INVENTION

Embodiments of the invention described herein pertain to the field of weed removal from earth by an autonomous differential wheeled robot. More particularly, but not by way of limitation, embodiments of the invention enable a robot system and method of robotic weed removal in aesthetic mulch gardens.

BACKGROUND OF THE INVENTION

In a comprehensive review by Slaughter et al. (Elsevier, 2007), it is stated that "Autonomous robotic weed control systems hold promise toward the automation of one of agriculture's few remaining unmechanized and drudging tasks, hand weed control. Robotic technology may also provide a means of reducing agriculture's current dependency on herbicides, improving its sustainability, and reducing its environmental impact." This 2007 review describes three basic components needed in an agricultural robot: "(1) a sensing system to measure important physical and biological properties of the agricultural system (GPS, machine vision, imaging); (2) decision-making capabilities for processing information from the sensor system to determine how the agricultural system should be manipulated (CPU); and (3) actuators to manipulate the agricultural system accordingly (chemical spray, cutting, thermal, electrocution) ." Slaughter discusses extensively the need for plant species identification by means of machine vision so as to discriminate between weeds, crops, and other plants. He states that there are many studies of ground-based machine vision plant species recognition. The technology used in agricultural applications is extremely sophisticated and requires complex sensing equipment. A prior art agricultural autonomous intra-row weed control system described by Slaughter is shown in FIG. 1 and a schematic of a typical prior art weed control robot trajectory using intra-row guidance is shown in FIG. 2. The article points out that while herbicide-based weed control may be both biologically and economically effective, it has environment costs due to runoff and contamination of rivers and wetlands. In many locations, increasing pesticide use regulations, consumer concerns, and growing interest in organically produced foods limit the long-term application of herbicide application. Slaughter teaches that by virtue of precision control, robotic systems can eliminate or reduce the quantity of herbicide needed for agricultural weed control. However, the systems he describes are highly complex and require large robots as suggested by the fact that the robots are guided by the rows of crops. Slaughter shows a robot with two guidance cameras attached three meters apart to provide robust performance in widely spaced row crops, such as tomatoes.

It is an object of this invention to simplify the identification of weeds and simplifying the autonomous robot for application to an aesthetic mulch garden. It is a further object of this invention to provide a low-cost autonomous robotic weed removal system which is appropriate for the residential and commercial markets by downsizing the robot and using simpler and more economical technology.

Automating with robotic systems tasks that were hitherto laboriously performed by humans is often desirable because it frees humans to do more rewarding and productive work. In many cases, robots can perform tasks faster, more accurately, and with better efficiency. Garden maintenance can incur very high labor costs and the use of robots can often reduce the expense of garden maintenance substantially. Robots can perform tasks safely that can be hazardous for humans such as removing weeds from snake or wasp infested mulch beds.

The use of herbicides to remove weeds in aesthetic mulch gardens can destroy the ecologic balance and sicken wildlife. Herbicides can harm animals such as birds, squirrels, lizards, chipmunks, and rabbits. Additionally, they harm the overarching environment through infiltrating ground water. Personnel applying herbicides are subject to breathing and ingesting carcinogens which can be detrimental to their health. The cost of herbicides can be expensive, and the porosity of common mulch can be high and require large volumes of costly chemicals. It is therefore an object of the present invention to eliminate the use of herbicides and poisons to kill weeds.

As described by Koselka et al (U.S. Pat. No. 7,854,108), agriculture is one industry with traditionally low profit margins and high manual labor costs. In particular, harvesting can be expensive. For some crops, such as tree fruit, harvesting labor represents the growers' single largest expense, up to 50% of total crop cost. Increasing labor costs and labor short ages threaten the economic viability of many farms. Therefore, replacing manual labor with robots would be extremely beneficial for harvesting. Koselka '108 further stated that GPS controlled automated tractors and combines already operate in wheat and other grain fields. Automated harvesters exist that can blindly harvest fruit by causing the fruit to drop from a plant into a collection device. There is an abundance of prior art directed to automated large-scale harvesting of crops in farms. Such automated systems usually comprise a GPS sensor or other external navigational aids to determine position. Machine vision systems are known in the prior art. One known approach for automated harvesting of fresh fruits and vegetables and the like is to use a robot comprising a machine-vision system containing cameras. The cameras may be utilized to identify and locate the fruit on each tree and weeds around plants. The vision system may be coupled with a picking system or other task specific actuators to capture data from various locations in and around each plant when performing the picking or desired agricultural function. Calleija et al (U.S. Pat. No. 10,701,852) describes an automatic target recognition and management system for removing weeds using a tine that is actuated to swing in an arcuate direction to disrupt a targeted weed. Calleija '852 teaches that it is well known that one of the most important aspects in agriculture and crop cultivation is the effective management of weeds. He states that weeds compete aggressively for limited resources in terms of space, water, sunlight, and nutrients. Consequently, the emergence of weeds has a marked adverse impact on crop yield and quality. Moreover, due to their relatively fast growth rates compared to crops, if weeds are not eliminated or effectively managed, particularly during the preliminary stages after crop planting, they can quickly dominate entire fields and result in serious yield losses. Calleija '852, as in much of the prior art, is focused on large-scale farming. Calleija '852 further teaches a device for weed removal which has a multipronged tine which moves about at least one control axis in a predetermined direction between an engaged position wherein the tine formation in use contacts a ground surface for removal or destruction of targeted weeds, and a disengaged position wherein the tine formation is substantially retracted from the ground surface ['852: col. 6, ln 13-19]. A further aspect of Calleija '852 is a vacuum system having a suction device (e.g., nozzle) arranged adjacent to the weeding implement ['852: col. 6, ln 37-38]. Calleija teaches a very sophisticated machine vision and analysis system for identifying and mapping a variety of plants and weeds and selectively targeting weeds for removal, while leaving the crops undisturbed.

Yuan Biao et al. (CN111109237A) discloses an automated robot system for agricultural weeding based on camera recognition utilizing a comparison module which compares weed images with crop images and thereby identifying weeds to be removed while crops are prevented from being removed by mistake. Yuan Biao '237 discloses weed removal by means of robots having chemical agents to spray on weeds. A light source module is used for supplementing light during target identification. The weeding method seeks to avoid damaging crops as weeds are sprayed with herbicides and chemical agents. The robot system is based on a mobile terminal which interfaces with a stationary base station having a central processing unit to direct operations. The stationary base station and the mobile weeding robot communicate with a bidirectional signal connection.

It is important to note that agricultural weed removal solutions using the aforementioned large intra-row agricultural robots employ very advanced technology incurring substantial equipment and operating costs which, while cost-effective in large agricultural operations for the reasons previously discussed, are far too expensive for robotic weed removal in aesthetic mulch gardens. The robotic weed removal system for aesthetic mulch gardens described in this specification provides a cost-effective solution with relative simplicity which can provide effective weed control in aesthetic mulch gardens found in gardens typically found in residential, retail, and commercial environments.

Aesthetic gardening is extremely common in urban and suburban areas and is designed to beautify a home or commercial enterprise. Aesthetic gardens have flowers, shrubs, rocks, wooden structures such as railroad ties or tree stumps, ceramic statues, and the like. The garden is usually bounded by a large grassy area or by a brick or stone patio. Rather than have the soil directly facing the surrounding atmosphere, a layer of mulch helps protect the soil from baking in direct sunlight and it helps the soil hold moisture so that their watering requirements are reduced. Most sources recommend a layer of from 2-3 inches of mulch over the soil. FIGS. 3 and 13 show exemplar mulch gardens.

Mulch is any material that covers the soil's surface. It can include shredded or chipped bark, straw, or hay, fallen leaves and plant debris, compost, wood chips, rotted manure, cardboard, or even seaweed. Depending on the type of mulch, it can be used to beautify the garden with rich dark contrasting color between the ground and flowers and shrubs. Mulch is usually dark and of uniform color. Maintaining aesthetic mulch gardens is a tedious process because of the continual emergence of small, localized weeds which can overwhelm a garden if weeds are not removed frequently as they emerge. When done manually, weed removal is a tedious time-consuming process with high labor costs. Weed removal in mulch gardens generally requires a person to crawl around on his/her hands and knees to remove, one-by-one, each weed. Also, mulch gardens can be home to various creatures including wasps and snakes, which can make hand-weeding mulch gardens hazardous.

There is a dearth of literature teaching the use of autonomous robotic weed removal to address this important issue. It is an object of the present invention to address this need by producing technology which allows frequent removal of weeds as they form and while they are small so as to eliminate the need for humans to remove the weeds by hand and to maintain the aesthetic mulch garden in a nearly pristine weed-free condition.

It should be noted that by covering the soil, mulch naturally reduces weed growth, which is a major source of its popularity in domestic and commercial applications. However, as previously stated, slowly but surely, weeds do grow in mulch beds and must be maintained or else the mulch bed becomes unsightly with an abundance of weeds. If the mulch bed is frequently maintained, unsightly weed presence can be minimal and the weeds that do emerge can be extracted while they are relatively small, and their roots have not penetrated deeply into the soil. However, if it is not regularly maintained, weeds can become abundant and large and destroy the aesthetic value of the mulch bed and become harder to remove as their root systems become deeper and more mature.

If the mulch bed is maintained at frequent intervals such that weeds remain relatively small, preferably with a footprint smaller than 1-2 inches, the forces required to remove weeds from mulch beds are small. It is an object of the current invention to utilize the low force requirements in extracting emergent weeds which is inherent to mulch gardens to simplify and reduce the cost of robotic extraction and maintain the size of the robot fairly small so as reduce cost and improve its ability to follow trajectories between typical obstacles found in mulch gardens. Said force requirement is directly related to the size of the weed since it is desirable to effectively remove the entire root system of the weed during extraction, and this required deeper penetration of the soil, which requires more force. Large forces require heavier robots to counter the consequentially larger reaction forces of weed extraction devices that must penetrate deeper into the soil to extract the root system of the weeds. Hence, it is an objective of this invention to provide a relatively small, light-weight robot, which can remove small weeds along with their root systems efficiently and with sufficient frequency such that the weeds are not allowed to grow to large sizes.

While weed removal from large-scale agricultural facilities and weed removal from relatively small aesthetic mulch gardens have many similarities, the above-described characteristics show that the two applications are different in many important respects and that weed removal technology in an aesthetic mulch garden lends itself to novel technologies that are not viable in the large agricultural setting, and vice versa.

The typical characteristics of an aesthetic mulch garden are (1) they have generally small areas in comparison to the lawn or patio that they typically are adjacent to; (2) the mulch used in aesthetic gardens is usually of fairly dark and uniform color. Mulch can often be purchased dyed and in a chosen color; (3) mulch is often laid on fairly level ground since attempting to lay it on steep hills with large inclinations invites runoff when it rains; (4) flowers and shrubs planted in mulch generally protrude substantially above the mulch bed and are easily visible. Unlike the agricultural application where discriminating between a weed and a crop may be very difficult and require state-of-the-art machine vision techniques, in an aesthetic mulch garden, weeds are very much smaller than shrubs or flowers, and can easily be discriminated on the basis of size, provided there is frequent maintenance and the weeds are not permitted to grow large; (5) mulch beds are often delineated with some border material such as plastic or brick; (6) Weeds that appear in mulch beds are usually highly visible because of the contrasting color between the weed and the mulch, which is a reason for considering them to be unsightly; (7) the more frequently weeds are removed from the mulch bed, the smaller the weeds, and the lower the force requirements to pull them out, and the smaller the volume of the removed mulch, and the smaller the robot. All of these features combine to provide a specialized robot meeting the objectives of this invention.

It is an object of the present invention to simplify the technology developed for autonomous robotic weed removal in agriculture to adapt to the needs of an entirely different market segment: the residential and commercial aesthetic mulch garden maintenance. A further object of the present invention is to simplify the task of machine vision to discriminate between a small, usually green, weed and a dark, usually brown or black, mulch, rather than to discriminate on more sophisticated classification and mapping. A further object of the present invention is to disclose a small, lightweight, autonomous robotic weed removal system that takes advantage of the unique characteristics of an aesthetic mulch garden as described above. A further objective of this invention is to provide an effective robotic weed-search trajectory appropriate for an aesthetic mulch garden based on reflective randomization strategy rather than the intra-row guidance strategy used in agricultural robotic weed removal. A further object of the present invention is to simplify the machine vision requirements by exploiting the natural visible color contrast between weeds and mulch. A further objective of the present invention is to use low-cost modern sensing technology coupled with a small lightweight robot to provide an economical solution to maintaining aesthetic mulch gardens. A further objective of the present invention is to help the environment by using mechanical weed removal and avoiding herbicides and chemicals.

It should be noted that weed removal methodologies rarely provide complete extraction of a weed, despite the desirability of doing so. Generally, a small fraction of the weed root system may remain in the soil and continue to grow as soon as the robot has extracted a large portion of the weed. The complete removal of a weed during an extraction process, while desirable, is not necessary, nor is it probable. A person of ordinary skill in the art would understand that this is yet another reason why it is important that robotic weed extraction be a frequently repeated process. The rapidity of this reemergence of weeds depends much on the type of weed, the depth of its root system, the amount of irrigation provided, the nature of the mulch, the amount of sunlight, and the effectiveness of previous weed removals, and other factors. These factors, in-turn, determine the frequency to which this invention must be utilized.

SUMMARY OF THE INVENTION

A system and method for removing weeds from an aesthetic mulch garden with a domain having predefined boundaries which comprises a wireless autonomous robot controlled by a central processing unit (CPU) and powered by an on-board electrical power supply such as a battery. Controlled by the CPU, the robot has a navigation module, a propulsion module, and a weed extraction module.

The navigation module has three levels of sensor which inform the CPU: (1) A domain boundary detection system which confines said robot to said domain, and whereby said robot is programmed to follow a substantially linear trajectory. Sensors continuously seek the boundaries of said domain; (2) An independent collision avoidance system with a sensor which detects trees, shrubs, statues, landscaping rocks, lighting, and other objects present in an aesthetic mulch garden which might interfere with the robot's search protocol; (3) A machine vision system with a camera which identifies weeds and positions the robot accurately to enable removal or destruction of said weeds.

The said domain boundary detection system, in order to restrain the trajectory of said robot to the interior of said domain, the invention includes a means for defining the boundaries of said domain. The user defines said boundaries prior to activation of said robot and prior to the inception of the robot's weed removal process. In accordance with the invention, the user can define the domain of the aesthetic mulch garden by a variety of methods which includes: defining the boundary of said domain by implanting at regular intervals magnetic stakes on the boundary of said domain and equipping said robot with a magnetometer to detect the magnetic field generated by such magnetic stakes; defining the boundary of said domain by burying a conductor which transmits radio waves around the boundary of said domain and equipping said robot with a radio receiver to detect such radio signals; programming the position coordinates of the boundary of the domain into said CPU controlling said robot which can be positioned with a control system using GPS technology; surrounding said domain boundary with LED rope lights which are illuminated by an independent power supply and equipping said robot with a photodetector to detect such luminous signals from the LED rope; and other methods which define said boundary in terms that can be processed by the CPU in conjunction with a suitable sensor to determine when the robot is approaching the boundary. In the event that a boundary is detected by the domain boundary detection system, CPU commands said robot to stop and turn by a prescribed angle, followed by an instruction to continue on a linear trajectory at a prescribed speed.

In accordance with this invention, the overall trajectory of said robot must be such that it searches the domain in its entirety. In accordance with this invention, it achieves this by means of following a reflective randomized trajectory. Upon activation, said robot commences its trajectory linearly. It continues linearly until a boundary, an obstacle, or a weed is detected by a sensor. At that point, the CPU commands the robot to stop. If the robot encounters a weed, the protocol of the weed machine vision system is invoked. If the weed is removed, or the robot encounters a boundary or obstacle, the CPU orders said robot to pivot on its vertical axis by the reflection angle (a fixed angle specified in the navigation module). Said robot the resumes a linear trajectory until either a weed, a boundary, or an obstacle is encountered whereby the process is initiated repeatedly until the entire domain has been searched, a timer has reached a preprogrammed time limit, or the user deactivates said robot. Thus, the current invention removes weeds throughout the domain by means of a search strategy of randomly reflecting from detected boundaries and obstacles through a large plurality of encounters until a large fraction of the domain is searched.

A collision avoidance system is included with an independent sensor which mounted in the forward-facing portion of said robot to detect large obstacles relative to the weed size which might interfere with the robot's search protocol or potentially damage the robot. The field of view of the sensor is equal to or larger than the width of said robot and has a depth of field no smaller than the stopping distance of the robot. It is not necessary for the collision avoidance system to provide an accurate image of the obstacle but is intended to enable said robot to detect trees, shrubs, statues, landscaping rocks, lighting, structures, and other objects that may be present in an aesthetic mulch garden and issue warning signals to the CPU. In the event that such an object is detected, CPU commands said robot to stop and turn by a prescribed reflection angle, followed by an instruction to continue on a linear trajectory.

The weed machine vision enables the robot to detect weeds within said domain and to position said robot for weed removal. The weed machine vision system includes a camera which is directed at an angle towards the ground where it is focused. The field of view of the camera is at least twice as large as the anticipated size of the weed. Since the mulch is expected to be of a dark nonhomogeneous color and the weeds normally have a substantially different contrasting color with respect to said mulch, color discriminating software within the CPU can identify the presence of weed based both on color and size. To enhance the colorimetric contrast between mulch and weed, and to enable the invention to be used in the dark, a lamp which illuminates the area of view of the machine vision camera may be added and fixed to said robot. To further enhance contrast, optical filters may be used on the said lamp. Since the invention is contemplated to be used frequently for garden maintenance, the system is intended to detect weeds at their inception when they begin to emerge from the surface of the mulch when the weeds are relatively small. Therefore, the size of the weed is anticipated to be smaller than said field of view of said camera. Similarly, shrubs, which are much larger than the field of view of said camera, can be identified by the discriminating software in the CPU to not be identified as a weed based on its size. Once a weed is identified, the CPU with input from the machine vision camera accurately positions said robot for weed removal or destruction.

The propulsion module has a motor controller that can receive commands from the CPU to control said robot drive motors so as to enable said robot to translate, turn, start, and stop, adjust speed, as well as other propulsion commands as may be needed. Said robot preferably may have three wheels or four wheels. The robot may also use alternative methods of direct propulsion such as artificial legs, propellers, and crawler wheels as seen on cranes and military tanks. In one configuration, the rear wheels drive the robot and are powered by an electric drive motor, while the front wheels provide steering, and the steering mechanism is controlled by a servo motor. Alternately, the driving motor can be in front of the robot, while the steering servo motor can be at the rear. Both drive motors and steering servo motors are controlled by a motor controller which receives instructions from the CPU and receives power from said on-board electric power supply. Another configuration which provides better, and simpler control is to have the two front wheels of said robot being driven by two independent electric drive motors while both rear wheels are driven by one independent drive motor. All three drive motors are controlled by the motor controller which receives commands from the CPU. With this latter embodiment, the need for a mechanical steering mechanism is eliminated and turning can easily be accomplished by directing each front wheel to rotate at different speeds. To achieve very precise turning, one drive wheel can be directed to rotate in one direction while the other front drive wheel is directed to rotate in the opposite direction. One of ordinary skill in the art can easily find other combinations of drive wheels and drive motors which fall within the teaching of this invention.

The weed extraction module causes either complete extraction or termination of the growth of the weed in the aesthetic mulch garden. As previously discussed, said robot searches for weeds as described so that the CPU directs the robot to position itself directly above the weed at the proper location for extraction or termination. In one configuration the weed removal is done with a servo-controlled 2-axis multi-clawed grabber to grip weeds and extract them from the mulch bed. Other mechanical methods where a weed extraction device is mounted on said robot and is directed by the CPU to cause extraction are within the scope of this invention. As described by Calleija et al. (U.S. Pat. No. 10,701,853), such methods may include end effectors mounted to said robot which take the form of a tine, sometimes arranged in plurality, an auger, a hoe, a scythe, a knife, a cultivator, a fork, a brush, a disk or other implement which may scoop or rotate in a manner in which a weed is removed from the ground. In addition, the literature shows non mechanical methods of weed extraction and termination (e.g., Slaughter et al.) including delivering herbicides broadly with sprays, or locally with jets and microjets, energetic laser beams, electric arcs, etc. The present invention may be adapted to include these and other means of weed extraction or destruction since they can be attached to an end effector in said robot. The present invention includes a built-in suction system to remove the weed from mechanical weed removal apparatus and deposit it in a receptacle mounted on said robot for later disposal. Said suction system can be controlled by the CPU to operate for a short period of time after the weed is removed which further cleans the mechanical extraction device and readies it for its next deployment. The robotic propulsion, navigation, collision avoidance, weed identification, weed removal, and other actions are autonomously controlled with one or more digital central processing units which receive input from all sensors.

The robot for use in weed removal in an aesthetic mulch garden must be small enough so that it can pass through and around a multiplicity of objects including shrubs, statues, trees, structural elements, and the like which expected to be present due to the artistic nature of mulch gardens. Said robot must be capable of deftly maneuvering in a tight environment where the domain is highly irregular in shape and there may be many obstacles. Said robot must be stable as it traverses an uneven groundcover of mulch which may be soft and spongy, and said robot must be capable of positioning itself fairly accurately. Said robot must be sufficiently robust to carry several motors, servos, a battery or other electrical power supply, a CPU with various electronics, steering mechanisms, a receptacle for removed weeds, a vacuum device for providing suction, and to have the heavy-duty structural elements needed to support all of this equipment. The weight of said robot must be sufficient to dominate the vertical reaction forces generated by the weed extraction module, which employs a specific extraction method, so that it may function properly and effectively remove weeds including their roots from an aesthetic mulch garden. Further, it will preferably be equipped with protective covering for the components or housing. Said covering may be resistant to weather since it is contemplated that the removal process may take place outside during rain or other inclement weather.

In operation, upon being activated by the user, said robot will patrol the defined domain of the aesthetic mulch garden, following a random reflective trajectory, whereby the robot reflects at a prescribed reflection angle from boundaries and obstacles leading to a randomized trajectory. During the course of following this trajectory, said robot searches for weeds by employing machine vision based on color contrast between weeds and mulch, and it removes weeds when encountered while avoiding shrubs, statues, structures, rocks, and other obstacles, and confining its operations to the interior of a domain that is defined by the user.

The present invention is in distinct contrast to prior art which disclose methods for weed removal in large-scale agricultural applications where crops are planted in regular, substantially linear rows. The agricultural robot trajectory generally follows substantially straight rows of crops and prior art agricultural systems require highly sophisticated mapping systems to discriminate between weeds and crops, both of which may have similar coloring and size.

BRIEF DESCRIPTION OF THE FIGURES

This patent and application file contains at least one figure executed in color. Copies of this patent or patent application publication with color figures(s) will be provided by the Office upon request and payment of the necessary fee.

FIG. 1 is a PRIOR ART agricultural autonomous intra-row weed control system [Slaughter et al 2007].

FIG. 2 is a schematic of a PRIOR ART trajectory of an agricultural weed control robot by intra-row guidance.

FIG. 3 is a schematic of the trajectory of a mulch garden weed control robot by reflective randomization in accordance with the preferred embodiment.

FIG. 4 is a side view of a mulch garden weed control robot in accordance with the preferred embodiment.

FIG. 5 is a top orthographic view of the mulch garden weed control robot shown in FIG. 4.

FIG. 6 is a bottom orthographic view of the mulch garden weed control robot shown in FIG. 4.

FIG. 7 is a schematic of the control system architecture for the mulch garden weed control robot shown in the embodiment of FIG. 4.

FIG. 8 is a process diagram showing the control of navigation, search, and weed removal for the mulch garden weed control robot shown in the embodiment of FIG. 4.

FIG. 9 shows the steps of the weed extraction process for the mulch garden weed control robot shown in the embodiment of FIG. 4.

FIG. 10 shows the dual servo operation controlling the "grabber claw" weed extraction device for the mulch garden weed control robot shown in FIGS. 4 and 9.

FIG. 11 shows the results of a sample calculation to determine the preferred spacing for the magnetic stakes using a representative type of permanent magnet.

FIG. 12 shows the relationship between the machine vision camera field of view and the longitudinal axis of the robot.

FIG. 13 Shows a photo of a typical aesthetic mulch garden indicating weeds to be extracted and various objects such as shrubs and trees that must be distinguished and bypassed by the robot.

FIG. 14 Shows a sequence whereby in FIG. 14(a), the machine vision camera can photograph a weed at high resolution (300 pixel/in), and FIG. 14(b) shows the same photograph at low resolution (5 pixel/in), and FIG. 14(c) shows the same pixels for the green weed, but background pixels corresponding to the mulch are converted to black.

FIG. 15(a) Shows a low-resolution field of view containing a weed, corresponding to FIG. 14(c), having a blackened background and the Field of View coordinate system employed to identify the location of the centroid of the weed.

FIG. 15(b) Shows the relationship between the robot weed grabber claw positioning coordinates and the camera Field of View coordinates.

FIG. 16 Shows the process by which the CPU in coordination with the machine vision identifies a weed.

DETAILED DESCRIPTION OF THE INVENTION

As seen in FIG. 3, this invention discloses a system and method for searching for and removing weeds 3 from an aesthetic mulch garden 5 having a domain 10 with a closed user-predefined boundary 12 which comprises a wireless autonomous robot 15 controlled by a central processing unit (CPU) 100 and powered by an on-board electrical power supply (not shown) such as a battery. A preferred embodiment of said robot 15 is shown in detail in FIGS. 4, 5, and 6. FIG. 7 shows the control system with said CPU 100 receiving inputs from domain boundary detector 125, collision avoidance detector 40, and weed detector 35 and sending outputs to the propulsion module 120, and the weed extraction module 130. Robot 15 has a base 95 which forms the central structural element to which all hardware associated the robot navigation module 110, the weed extraction module 130, the propulsion module 120, the electric power supply 115 and the CPU and related sensors, cameras, and electronics are mounted.

In the preferred embodiment, the CPU 100 is a Raspberry Pi 4 Model B, which has a Broadcom BCM2711 quad-core Cortex-A72 which is a 64-bit System on a Chip (SoC) which operates at 1.5 GHz. This CPU has with 2 GB SDRAM and Bluetooth enabled. It includes a Videocore VI Graphics Processing Unit (GPU) which enables graphical input/output such as input from machine vision. It also has multiple USB3.0 inputs/outputs for simultaneous operation of multiple peripheral devices including sensors (e.g., 35, 40, and 125), motor controllers (e.g., 82), and servos (e.g., 300, 305). The Broadcom unit is equipped with a Wi-Fi antenna which enables direct commands from a user with a Bluetooth transmitter (e.g., cell phone, tablet) to the CPU 100 to control said robot 15 while in operation if desired. The Raspberry Pi 4 CPU is designed to be configured with a machine vision camera 35 such as the SONY IMX219PQH5-C 8 Mega-Pixel CMOS Image Sensor (herein referred to as a machine vision camera) with square pixels. The color system of the said SONY IMX219PQH5-C camera utilizes the R, G, and B primary color pigment mosaic filters and has an electronic shutter with a variable speed. The Raspberry Pi 4 can be programmed in C/C++, Python 2/3, and Scratch by default. However, nearly any language compiler or interpreter can be installed on the Raspbian Operating System which controls the Raspberry Pi 4.

As further seen in FIG. 3, in the preferred embodiment, the domain 10 of the aesthetic mulch garden 5 is defined by the user by placing a plurality of magnetic stakes 20 on the boundary 12 of said domain 10 with a spacing 22 that is roughly regular. As shown in FIG. 7, when the autonomous robot 15, following its trajectory 25 and under the scrutiny of the robot navigation module 110, comes into proximity to one of the magnetic stakes 20, the domain boundary detector 125, which in the preferred embodiment is a digital positioning multi-axis magnetometer, detects one or more magnetized stakes 20, which then signals the CPU 100. As shown in FIG. 8, the CPU 100 then commands S215 said robot 15 to stop and reflectively turn by a prescribed reflection angle 27, in the range 60°-120°. In accordance with S205, CPU 100 then commands said robot 15 to follow a linear trajectory 25 in the reflected direction. As seen in FIG. 3, the CPU thereby directs the movement of said robot 15 to patrol for weeds 3 with a trajectory 25 constrained inside said boundary 12 and continues to repeatedly cross the domain 10 following a series of random reflections until either a preprogrammed time limitation is met, a minimum frequency of weed detection criteria is met, or the robot 15 is deactivated by the user or by other criteria which may be programmed into CPU 100.

In alternative embodiments, the domain boundary detection system 125 can use other methods by which the user can define the boundary 12 of the domain 10, and, corresponding to those methods, an appropriate domain boundary detector 125 can be used. Examples of such domain boundary detectors 125 and methods include: (1) burying an electrical conductor which transmits radio waves around the boundary 12 of said domain 10 and having a domain boundary detector 125 mounted in said robot 15 be a radio receiver to detect such radio signals, and when said robot 15 is in close proximity to said boundary 12 as shown in FIG. 8, said detector 125 then signals CPU 100 which issues commands in accordance with FIGS. 7 and 8; or, (2) having the user program said CPU 100 with the position coordinates of the boundary 12 of the domain 10 and controlling said robot 15 on trajectories inside the boundary 12 using in a domain boundary detector 125 GPS technology or other wireless position coordinate measurement technologies to determine when said robot 15 is in close proximity to said boundary 12 as shown in FIG. 8, said detector 125 then signals CPU 100 which issues commands in accordance with FIGS. 7 and 8; or, (3) user placing on said boundary 12 LED rope lights which are illuminated by an independent power supply and having a domain boundary detector 125 mounted in said robot 15 be a photodetector to detect such luminous or chromatic signals from the LED rope detect such luminosity, and when said robot 15 is in close proximity to said boundary 12, as shown in FIG. 8, said detector 125 then signals CPU 100 which issues commands in accordance with FIGS. 7 and 8. The scope of the invention includes other similar methods where the user can define said boundary 12 which can be sensed by corresponding boundary detection systems 125 which can provide input to said CPU 100 which controls said robot 15 as taught in this invention.

In the preferred embodiment, the robot 15 searches for weeds 3 with the novel randomized reflective trajectory scheme described above, where said trajectory 25 is shown in FIG. 3 whereby the linear trajectory 25 of robot 15 reflects from the boundary 12 at a fixed reflection angle 27 when encountering the magnetic signal from the magnetic stakes 20 at the boundary 12. A reflection angle 27 of 100 degrees is used, although the user may wish to program the CPU with different values depending on the size of the domain 10, the level of weed 3 removal (generally less than 100%), and the time desired to complete the weed removal process. The magnetic stakes 20 placed on the boundary 12 of said domain 10 have permanent magnets attached above the ground, preferably not more than one inch for aesthetic reasons. The magnetic field strength of the magnets, the spacing 22 between said magnetic stakes 20, and the sensitivity of the magnetic field strength that said magnetometer 125 is capable of measuring may be varied to obtain a clear signal when said robot 15 approaches said boundary 12. The magnetic flux density, B, may be calculated for a specified permanent magnet, magnet stake spacing 22, and distance from the boundary. Design should be based on the weakest signal which occurs at the midpoint between magnetic stakes 20. The following equation determines the magnetic flux density, B, along a line perpendicular to the boundary 12 midway between said magnetic stakes 20, in the horizontal plane:

$$B = \frac{D^2 L B_r}{8\left[x^2 + \left(\frac{d}{2}\right)^2\right]^{3/2}}$$ (Equation 1)

where:
B=magnetic flux density (Gauss)
$B_r$=residual magnetic flux density (Gauss)
D=diameter of disc type permanent magnet
L=thickness of disc type permanent magnet
d=spacing 22 between magnetic stakes 20
x=distance from boundary 12 measured perpendicular to midpoint between magnetic stakes 20

A sample calculation using Equation I is shown in FIG. 11 for a commercially available neodymium permanent magnet in the form of a disc of 0.75 inch diameter and 0.375 inch thickness with axial polarity where the magnetic flux density, B, was calculated as a function of the perpendicular distance, d, from said boundary 12 in the horizontal plane, for three representative spacings 22 of said magnetic stakes 20. Note that the residual magnetic flux density, $B_r$, is a physical property of the magnetic material and is generally available as a specification for a given permanent magnet. From the calculation shown, the preferred choice of spacing for said magnetic stakes 20 is 9 inches because the said robot 15 should be commanded to stop at about 2 inches from the boundary. With a 9-inch spacing, the magnetic flux density is about 3.0 Gauss which is well within the operating range of the +/−8.0 Gauss specification on the selected magnetometer within said domain boundary detector 120. When domain boundary detector 120 signals CPU 100 that a magnetic field of say 3.0 gauss is detected, CPU 100 would then command robot 15 to stop as in S210 shown in FIG. 8. CPU 100 would then proceed issue a command to stop and turn said robot 15 the prescribed angle of 100° according to S215.

One of ordinary skill in the art would recognize that the optimum spacing would depend on type of material from which the magnet is made, the residual magnetic flux density, $B_r$, the shape of the magnet, the diameter and thickness of the magnet, as well as the sensitivity of the magnetometer used in said domain boundary detector 125. The cost of the magnets would also be another factor in deciding on the optimal spacing as the cost increases with the number of magnets, the size of the magnets, and the material of the magnets.

In the preferred embodiment, the results of the calculation of FIG. 11 are used. Said magnetic stakes 20 are spaced at about 9-inch intervals, and the magnets mounted on said magnetic stakes 20 are neodymium and of cylindrical in shape with 0.75-inch diameter and 0.375-inch thickness with axial magnetization. The polarization axis of said magnet is axial and attached to the top of the stakes with the axis vertical. While neodymium magnets were selected in the preferred embodiment, because of their strong magnetic field, low cost, permanency, and robustness, many other types of permanent magnet are within the scope of this invention. These include ceramic ferrites alnico, rare earth magnets, and others. In other embodiments, magnetic stakes 20 could also include electromagnets. Since the magnetic field strength decreases as the cube of the distance from the magnet, and the magnetometer must detect the magnetic field as it approaches said boundary 12, the magnetometer that is used must be capable of detecting a much lower level of magnetic field than that surrounding said magnetic stake 20. Thus, in the preferred embodiment, a ±8 gauss 3-axis magnetometer such as the MEMSIC MMC5883MA is used which can detect the magnetic field at least three inches from said boundary 12. To most accurately define the contours of said boundary 12, while minimizing the number of magnetic stakes 20 needed, there is a tradeoff. Clearly, the smaller the spacing 22 between magnetic stakes 20, the better the definition of the boundary 12. However, in the aesthetic garden application, defining the boundary 12 with great precision may not be needed, while minimizing the number of magnetic stakes for aesthetic and cost reasons may be a dominant consideration. The smaller the spacing of the magnetic stakes 20, the greater the number of magnetic stakes 20 required, which adds to the material cost, the labor cost of installation, and the general appearance of the boundary 12 of the aesthetic mulch garden 5.

As seen in FIGS. 3 and 13, an aesthetic mulch garden 5 may have many objects which may obstruct said robot 15 as it patrols the domain 10 in search of weeds 3. These include trees, shrubs, rocks, statuary, structural elements, and the like. In order to enable said robot 15 to avoid interaction with these objects, the robot navigation module 110 includes a collision avoidance detector 40, as seen in FIGS. 4, 5, 7. As seen in FIGS. 7 & 8, when said collision avoidance detector 40 locates an object larger than a preprogrammed dimension, it sends a signal to said CPU 100, which then commands said robot 15 to stop, turn by the said preprogrammed reflection angle 27, which is 100 degrees in the preferred embodiment, and continue on a linear trajectory 25. In the preferred embodiment, said collision avoidance detector 40 is an ultrasonic distance measuring range sensor. A commercially available collision avoidance sensor 40 which may be used in the preferred embodiment is the TDK CH101 Ultrasonic Range Sensor. This embodiment of collision avoidance sensor 40 has a customizable field of view which can be made narrow enough to limit the view to objects on the trajectory of said robot 15. Said collision avoidance sensor 40 can detect objects within a range of 4 cm to 1.2 m and has programmable modes optimized for medium and short-range sensing applications. Said embodiment of collision avoidance sensor 40 works in any lighting condition, including full sunlight and complete darkness, and it is insensitive to object color. Said embodiment of collision avoidance sensor 40 is fully programmable to detect objects in a larger size range so as to be limited to the larger objects such as shrubs, rocks, trees, and the like, and not be sensitive to smaller objects such as weeds. In other embodiments of this invention, commercially available radar range sensors or laser range sensors may also be used as collision avoidance sensors 40 and are well within the scope of the present invention.

As best seen in FIG. 6, the preferred embodiment of said robot 15 is also equipped with machine-vision camera 35 that identifies and locates weeds based on chromatic contrast in visible radiation emanating from the mulch and the weeds. As best seen in FIG. 12, said machine-vision camera 35 is focused on the ground a short distance ahead of said robot 15 with a controlled camera field of view 370 which can be adjusted by the user with a suitable lens hood extension (not shown) attached to the lens of said machine-vision camera 35. A lamp (not shown), which can be activated and deactivated by CPU 100 as programmed by user, may be directed to illuminate said field of view 370 so as to enhance contrast between weeds and mulch, and to enable operation of said machine-vision weed detector 35 in the dark. Such lighting may comprise light emitting diodes or incandescent bulbs and include optics which focus said illumination on the camera field of view 370 and may also include polarizers and/or filters acting on the illumination so as to enhance contrast. As seen in FIGS. 7, 8, and 9, when said weed machine-vision detector 42 detects a weed 3 as indicated in S220, a signal is sent to CPU 100 which then commands said robot to position itself S225 and S230 for weed 3 removal. CPU 100 then activates and commands the weed extraction module 130 in accordance with steps S235, S240 for weed 3 removal. The following paragraph explains how this might be done in one preferred embodiment.

In the preferred embodiment for locating weeds 3 in a mulch garden 5, the camera field of view 370 has dimensions of 6 inches in width and 4 inches in depth as is schematically shown in FIG. 12. The center of said camera field of view 370 is located about 12 inches directly in front of said robot 15. The user might alter these dimensions in accordance with the specific application and in accordance with the speed vs. accuracy tradeoffs that a person of ordinary skill in the art might deem necessary.

In the preferred embodiment, the CPU 100 is a Raspberry Pi 4 Model B, with a machine vision camera 35 such as the SONY IMX219PQH5-C 8 Mega-Pixel CMOS Image Sensor with square pixels which utilizes the Red, Green, and Blue (RGB) primary color pigment mosaic filters as described above. RGB is a widely known system in which the primary colors, Red, Green, and Blue can produce a vast array of colors by additive synthesis. Colors are coded digitally as an RGB file where an arbitrary color can be stored digitally in three bytes of data, each having 8 bits or 256 possible values. Thus, an 8 bit per channel RGB file has one byte for red which is R=0 to R=255, a second byte for green is G=0 to G=255, and a third byte for blue is B=0 to B=255. Blending the colors, an RGB file for black would be R=0, G=0, and B=0. An RGB file for white would be R=255, G=255, and B=255. In general, and RGB file can be written as a triplet: (R, G, B). Thus, a brownish color can be coded as (171, 122, 43). Given all of the possible values for R, G, and B, this system provides 256×256×256=16,777,216 possible colors. It should also be noted that while the 8 bits per channel RGB system is most common, other systems providing more colors include 12-bit, 16-bit, 24-bit, and 32-bit RGB systems. Also, there are many other systems for digitizing colors such as the CMY or CMYK color models. In the preferred embodiment, an 8-bit per channel RGB system is used but the invention is conceived to include all other such systems which are well known to those skilled in the art.

In the preferred embodiment, the machine vision weed detector 42 utilizes the fact that mulch gardens 5 are generally dark in color, while weeds 3 are generally green in color and small in size (assuming that the mulch garden is frequently maintained so as to avoid excessive weed growth). Thus, by considering the weed color, dark mulch color, the contrast of weed 3 with the mulch, and the size of the weed, a weed can be discriminated. This is a very simple means to locate weeds as opposed to the complex plant identification systems and mapping that was previously discussed in Slaughter et al. (Elsevier, 2007), which requires a very sophisticated and expensive sensing system to measure important physical and biological properties of the agricultural system and critically discriminate between unwanted weeds with vegetables and fruits to be harvested over vast areas.

The procedure used in the preferred embodiment to identify weeds 3 is shown with reference to FIGS. 3, 8 and 13. Said mulch garden 5 is to be searched for weeds 3 by robot following a linear trajectory in autopilot mode S205 by reflective randomization. Detecting S220 said weed 3, and positioning S225, S230, said robot 15 for extraction S235 of said weed 3 requires machine vision weed detector 42 which includes weed machine vision camera 35 to provide input of visual information to CPU 100 for command and control of said robot 15. A person of ordinary skill in the art would recognize that there are many methods by which machine vision can accomplish this task. However, the preferred embodiment of this invention utilizes a very simple and efficient method that is very amenable to programming robots in real time with minimal computational resources.

In the preferred embodiment, the machine vision weed detector 42, which includes a weed machine vision camera 35, seeks a green object within the rectangular field of view 370, shown in FIGS. 12, 14(*a*), and 15(*b*). In the exemplar embodiment shown in FIG. 14(*a*), said rectangular field of view 370 is horizontal with a width, W 405, of 6 inches and length, L 400, of 4 inches and is focused on the ground ahead of the robot 15 by a distance D 430, of 12 inches. This 6-inch by 4-inch field of view 370 has an image of a weed 3 in mulch garden 5 shown in FIG. 14(*a*) under high resolution conditions (300 px/in) and in FIG. 14(*b*) under low resolution conditions (5 px/in) as captured by machine vision camera 35 and processed. The longitudinal-vertical plane passing through said lens of said machine vision camera 35 mounted on the longitudinal axis 435 of said robot 15, as shown in FIGS. 12 and 15(*b*), also passes through the center of said field of view 370. The intersection of this vertical plane with the horizontal plane of said field of view 370 defines a longitudinal axis of robot 435, shown in FIGS. 12 and 15(*b*). As seen in FIG. 14(*a*), the Y-axis 375 of said camera field of view 370 is aligned with the edge of said camera field of view 370 and parallel to said longitudinal axis of robot 435. The X-axis of said field of view 370 is aligned with its base and is perpendicular to said Y-axis 375, as seen in FIGS. 14(*a*), 15(*a*), and 15(*b*), which is also aligned with and parallel to a longitudinal axis of said robot 15 and which passes through the center of said lens of said machine vision camera 35. A transverse-vertical plane passing through said center of said field of view 370 intersects with said horizontal plane of said field of view 370, shown in FIG. 14, defines an X-axis 380 which is perpendicular to said Y-axis and which passes through the base of said field of view 370, as shown. Thus, an X-Y coordinate system having an origin at the forward right corner of said field of view 370, as best seen in FIG. 15(*b*), and longitudinally aligned with said vision camera 35 and the weed grabber claws 45 is established. These coordinate axes are also aligned with the square pixels that define the image created by said machine vision camera 35 and seen in FIG. 14(*b*) for the 5 pixel/inch case. In this embodiment, the 6-inch by 4-inch field of view 370 is also characterized by a 30 pixel by 20-pixel array that corresponds with the coordinate axes. Said 30 pixel by 20-pixel array has 600 pixels in total, each one having a corresponding coordinate axis, X 380 and Y 375, respectively. This image is processed by said machine vision weed detector 42 as a 600-element pixel array and is analyzed by CPU 100. In other embodiments, a person of ordinary skill in the art may select a different resolutions and different fields of view 370, and thereby use an array of different number and dimension.

In the preferred embodiment, the RGB system of color synthesis is used whereby the color of each pixel is coded by three digital numbers corresponding to Red, Blue, and Green, each having values of N=0-250 in the form ($N_R$, $N_B$, $N_G$). By way of example, the RGB code for a common shade of dark brown is (78,67,63); for violet (238, 130, 238); for light golden brown (167, 133, 106) for forest green (34,139, 34); and for basic green (0,128,0). The RGB code for black is (0,0,0) and for white (255,255,255). The codes can also be expressed in hexadecimal form.

In the preferred embodiment, weeds are identified by virtue of the contrast between the green weed and the dark mulch. By reducing the resolution to a low value of around 5 pixels per inch or less for low resolution imaging, the pixel array inside the 6-inch by 4-inch field of view 370 has a relatively small number of elements (600 in this example). Given the high clock speed of the CPU 100, in excess of 1.5 GHz, calculations can be made in real time to ascertain the presence of a weed 3 as the robot 15 moves linearly at a low speed through the mulch garden 5 of between 5 to 20 feet per minute. When the presence of a weed 3 is determined by the CPU 100, S220 in FIG. 8, the robot 15 is halted immediately and then positioned for weed extraction S230.

In the preferred embodiment, the machine vision detector 42 has three criteria to identify a weed 3. As said robot 15 follows its linear trajectory in the autopilot mode, S205, the machine vision weed detector 42 continuously searches for weeds 3 within the camera field of view 370.

The first criterion is that the weed must be predominantly green. The CPU 100 polls the RGB color numbers in the pixel array which is provided by the weed machine vision weed detector 42 in all 600 pixels within the array and calculating, for each pixel, the fraction of G (green) as follows:

$$GF = \frac{N_G}{N_R + N_G + N_B}$$

where GF=Green Fraction

If GF≥0.40 save RGB color data

If GF<0.40 set RGB pixel data to (0,0,0) (black)

Thus, the pixel array is reconstituted such that only those pixels that meet criterion #1, GF>0.40, are identified with their actual RGB numbers, while the remainder of the pixels are blackened by giving the RGB numbers (0,0,0). In FIG. 14(*c*) is shown the result of blackening the background RGB data for the case of a weed 3 as shown in FIG. 14(*a*). The process is shown in FIG. 16. Thus, according to the criterion #1, the CPU 100 must poll the RGB pixel array. If there are at least one pixel that meets the GF≥0.40 criteria, the robot proceeds to criterion #2. If criterion #2 is not met, said robot follows S205 whereby robot 15 follows a linear trajectory in the autopilot mode.

The criterion #2 is whether or not the number of pixels meeting the first criterion are sufficient to constitute an actual weed 3 of a specified size. The size can be determined by counting the number of non-black pixels. Each pixel is square and has an associated dimension, e.g., 0.2 inch for a resolution of 5 pixel/inch. Since we seek a weed larger than 0.5 inches in linear dimension, corresponding to an area greater than 0.25 square inches, this would correspond to about 6.25 pixels meeting criterion 1. This criterion would be the minimum number of Green pixels in the field of view 370 that would be identified as a weed 3. In the example shown in FIG. 14(*c*), there is about 25 pixels. Applying criterion 2, if there are less than 6.25 pixels with color remaining in the array, the entire array is rejected and the robot 15 continues its search in accordance with S205. If criterion 2 is met, an optional third criterion of pixel connectivity is determined.

An optional criterion #3 is whether or not the pixels in the background erased array are consolidated into a single weed entity, or are they spread out in multiple locations around the camera field of view 370. This can be done by subdividing the camera field of view 370 into blocks and determining the green pixel density (GPD) within each block. Each block is then polled to determine the GPD:

$$GPD = \frac{\text{No. of Green Pixels in Block}}{\text{Total No. of Pixels in Block}} = \frac{N_G}{N_T}$$

where: Block=A preferably square subdivision of Field of View
$N_G$=Number of Green pixels in block.
$N_T$=Total Number of pixels in block In the case of the exemplar preferred embodiment, the field of view 370 is 6"×4", the user can define a block as 2"×2" subdivision, which would result in six blocks of 25 pixels each, for a 5 px/inch resolution. CPU 100 would calculate the GPD in each of the six blocks and poll them and determine if any one of the six blocks had a GPD≥GPD$_{base}$, where GPD$_{base}$ is set by the user to determine the cohesiveness of the pixels. For the exemplary preferred embodiment, a preferred value is determined by the expected size of a weed. In the exemplary preferred embodiment:

$$GPD_{base} = \frac{5}{25} = 0.20$$

Applying criterion 3, if after polling all of the six blocks, there is no block that has a GPD exceeding 0.2 the entire array is rejected and the robot 15 continues its search in accordance with S205. If criterion 3 is met, i.e., there is at least one block of the six with a GPD>0.2, the robot 15 halts its trajectory and control proceeds to weed machine vision positioning mode S225.

It is noted that the third criterion is optional because it is expected that the process will miss a certain fraction of weeds and that machine vision weed detector 42 will make some false identifications of weed 3. Criteria #3 helps to reduce the frequency of such errors. If criterion #3 is satisfied, CPU 100 determines that a weed has been detected in accordance with S220.

As previously stated, once the machine vision weed detector 42 identifies a weed 3 and transfers the relevant data to CPU 100, the robot 15 is halted and robot 15 follows weed machine vision positioning mode S225 and on to S230 to position weed grabber 45 directly above detected weed 3 as shown in FIG. 16.

It is important to note that the collision avoidance system will not permit a structure larger than a weed, such as a desirable plant or ornament, to enter the field of view of the camera. Therefore, confusion of weeds with other objects is avoided.

In this embodiment, as best seen in FIGS. 15(*a*) and 15(*b*), the CPU 100 commands robot 15 to position weed grabber 45 directly above the centroid 385 of the projection of weed 3 in the camera field of view 370 as required by S230. We therefore need to relate the coordinate system of the robot 15 with the coordinate system of the camera field of view 370.

This is shown in FIGS. 15(*a*) and 15(*b*). In 15(*a*), we see the camera field of view 370, also shown in FIG. 14(*c*), which has the low-resolution view of the weed 3 with a blackened background, but with the relevant coordinates identified. The centroid 385 of the weed 3 is shown along with its radial and angular coordinates ($r_{Centroid}$, θ), with origin X=0, Y=0. The location of the centroid with respect to the coordinates of field of view 370 can be calculated as follows:

$$X_C = \frac{\sum_{1}^{N} x_i \Delta_i}{\sum_{1}^{N} \Delta_i} = \frac{\sum_{1}^{N} x_i}{N}; Y_C = \frac{\sum_{1}^{N} y_i \Delta_i}{\sum_{1}^{N} \Delta_i} = \frac{\sum_{1}^{N} y_i}{N}$$

$$r_C = r_{Centroid} = \sqrt{X_C^2 + Y_C^2}; \theta_C = \tan^{-1}\left(\frac{Y_C}{X_C}\right)$$

where: ($X_C$, $Y_C$) are the Cartesian position coordinates of the Centroid of Weed 3
($r_C$, $\theta_C$) are the cylindrical position coordinates of the Centroid of Weed 3
($x_i$, $y_i$) are the Cartesian position coordinates of the i$^{th}$ pixel of weed 3 which correspond to the RGB pixels with G≠0.
$\Delta_i$=area of i$^{th}$ pixel=Δ=common area for all pixels
N=Total number of pixels of weed 3 (total number pixels with G≠0)

As shown in FIG. 15(*b*), once the coordinates ($r_C$, θ) of the centroid 385 of the weed 3 is determined relative to the X-Y coordinates of the field of view 370, the position coordinates (R,ϕ) of the weed 3 relative to the center of the weed grabber claws 45 must be determined. As seen in FIG. 15(*b*), the coordinates (R,ϕ) can be determined as follows:

$$R = \sqrt{(r_C \cos\theta - W/2)^2 + (r_C \sin\theta + D)^2}$$

$$\tan\phi = \frac{r_C \cos\theta - W/2}{r_C \sin\theta + D}$$

Once the coordinates (R,ϕ) are determined, CPU 100 can then command robot 15 to position said weed grabber claws 45 directly above detected weed 3 in accordance with S230. Thus, in accordance with FIG. 15(*b*), once the centroid of the weed 3 is determined, said robot 15 must change the angular direction of its longitudinal axis 435 by an angle ϕ 415 and move forward on a linear trajectory a distance R 410. At this point, said weed grabber claws 45 will conform to S230 and be ready to commence S235 so as to activate the weed extraction module 130 in accordance with S240, S245, and S250.

The weed extraction module 130 comprises claw elevation servo 300 and a claw grasping servo 305. FIG. 10 shows the operation of said servos 300 and 305. Claw elevation servo 300 is fixedly mounted on the base 95 of said robot 15 and output shaft of said claw elevation servo 300 is fixed to a servo frame 325 upon which said weed grabber claws 45 are mounted. As best seen in FIG. 10 steps S350 and S360, in accordance with commands from CPU 100, claw elevation servo 300 can retract said weed grabber claws 45 as seen in S350, or it can engage said weed grabber claws 45 as seen in S360.

Said grasping claw servo 305 is fixedly mounted on said servo frame 325 upon which servo frame claw 315 is integrally included, or fixedly attached. Grasping claw 310 is fixed to the pivoting output shaft of said claw grasping servo 305 in such a manner as when grasping claw servo 305 is so commanded by CPU 100, grasping claw 310 rotates with said output shaft of claw grasping servo 305 so as to pivot towards servo frame claw 315 as seen in FIG. 10, S330, where claws can grasp a weed, or pivot away from said servo frame claw 315 as seen in S340 so as to open said claws 45.

In operation, as seen in FIGS. 8 and 9, after said robot 15 is positioned for weed removal S230, said claw elevation servo 300 is activated to cause open claws 45 to descend and engage the ground surrounding a weed S235, then claw grasping servo 305 causes jaws of grabber to close around weed and hold it firmly S240. Weed grabber claw elevation servo 300 is then commanded by CPU 100 to pull said weed vertically away from ground S245. When claws 45 are in their upward position, CPU 100 commands claw grasping servo 305 to open while also commanding suction tube to clean claws 45 and transport said weed to weed receptacle 55, S250. CPU 100 then returns control to robot navigation module 110 and robot 15 continues searching for weed on a linear trajectory, S205.

While the preferred embodiment is the use of grabber claws 45 in the weed extraction module 130, as described to remove weeds efficiently in a mulch garden 5 and shown in FIG. 7, this invention does anticipate the use of other manners of weed extractors such as screw augers, scrapers, electric arc, lasers, and sprays of herbicides, and other known means which can replace the grabber claws 45 and follow steps corresponding to S235 through S250 in FIG. 8, with certain programming modifications well known to persons of ordinary skill in the art.

As seen in FIGS. 4, 5, and 6, and 7, the propulsion system of the preferred embodiment of the robot 15 consists of a right front drive wheel 60 powered by electric drive motor for right front wheel 80 and a left front drive wheel 65 powered by electric drive motor for left front wheel 85 which are independently controlled by CPU 100 through motor controller 82. Both rear wheels 70 and 75 are coaxially driven by a single drive motor for rear wheels 90 which are also independently controlled by CPU 100 through motor controller 82.

As seen in FIG. 7, the CPU 100 controls the direction of said robot 15 by sending commands to said propulsion module 120, which causes the front wheels 70 and 75 to rotate at different speeds, either in the same direction of rotation, or in opposite directions of rotation. If needed, this arrangement permits said robot 15 to pivot angularly about a vertical central axis without appreciable forward motion so that for collision avoidance, for example, said robot 15 moving along its linear trajectory can stop, pivot, and continue on a linear trajectory if commanded by CPU 100. Such an outcome might occur if CPU 100 issues commands in response to domain boundary detector 125 which detects a boundary 12, collision avoidance detector 40 which detects an obstacle, or weed detector 35 which detects a weed.

CPU 100 can control the speed of said robot 15 and is programmable by the user with a preferred speed between 5 and 20 feet/minute. Similarly, CPU 100 can brake said robot 15 by reducing the speeds of said wheel drive motors 80, 85, and 90.

Said robot 15 must be small enough so that it can maneuver between shrubs and obstacles but be large enough so that it can position itself over a weed and extract it. Furthermore, said robot 15 must carry an electrical power supply if significant size and weight so as to power said drive motors 80, 85, and 90, said servos 300 and 305, as well as lighting and electrical components, and to so providing a sufficient period of operation to effect weed removal from said mulch garden 5. While no means critical or a limitation to this invention, for typical mulch garden weeds in the size range of two inches, the preferred embodiment has a size for said robot 15 of a width of 9 to 18 inches, and a length of 9 to 18 inches, and a weight of 2.0 to 4.0 pounds. The weight of said robot 15 must be sufficient prevent vertical movement of said robot due to the vertical reaction forces caused by the penetration forces of said weed grabber claws 45, or other extraction means, to the depth of the weeds' roots. The weight of said robot 15 may be increased by the addition of ballast weights (not shown). For grabber claws 45 shown in a preferred embodiment, the vertical reaction force is typically less than two pounds. A user may wish to increase or decrease the size and weight of said robot depending on special requirement of particular applications.

A user may wish to use a larger or smaller battery, depending on the time needed to extract weeds from said mulch garden 5 and on the size of said robot.

Those skilled in the art will readily recognize numerous adaptations and modifications which can be made to the present invention which will result in an improved system and method for removing weeds from an aesthetic mulch garden using an autonomous robot, yet all of which will fall within the spirit and scope of the present invention as defined in the following claims. Accordingly, the invention is to be limited only by the scope of the following claims and their equivalents.

What is claimed is:

1. A weed detecting and weed removal apparatus for a mulch garden having a user pre-defined closed outside boundary comprising:
   an autonomous terrestrially mobile robot including a propulsion module for controlling the trajectory of said robot; and,
   a programmable central processing unit (CPU) for issuing positioning commands to said robot, issuing commands for weed extraction, and receiving inputs from a plurality of sensors, and performing calculations to generate said commands; and,
   an electrical power supply mounted on said robot to provide power to said propulsion module and to energize said central processing unit and said sensors; and,
   a domain boundary detection system to define said closed outside boundary of said mulch garden and to confine said robot trajectory to reflective random linear segments within said boundary; and
   a collision avoidance system for preventing interactions between said robot and obstacles present within said mulch garden, said collision avoidance system producing robot command signals to invoke the reflective randomization protocol of said robot trajectory; and,
   a machine vision weed detector for capturing images of a defined field of view within said mulch garden and identifying the presence of one or a plurality of weeds; and,
   a weed extraction module for removing said weeds from said mulch garden.

2. The apparatus of claim 1 further comprising: a propulsion module having a plurality of wheels which are driven by independent drive motors each of which are electrically connected to a motor controller which receives commands from said central processing unit to differentially actuate each wheel and thereby control direction and speed of said robot.

3. The apparatus of claim 1 having said propulsion module directed by said central processing unit to have said robot follow an essentially linear trajectory at a predefined speed unless said central processing unit receives a command from either said domain boundary detection system detecting proximity to said boundary, or said collision avoidance system detecting proximity to an obstacle, which results in a command to change direction by a user-prescribed angle in accordance with the reflective randomization protocol and continue on said linear trajectory.

4. The apparatus of claim 1 having said propulsion module directed by said central processing unit to have said robot follow an essentially linear trajectory at a constant speed unless said central processing unit receives a command from said machine vision weed detector upon which said central processing unit would command said robot to halt for calculations to determine if a weed has been encountered and, if said weed is encountered, to command said robot to assume position for weed extraction; or, if said weed was not encountered, directing said robot to proceed with an essentially linear trajectory.

5. The apparatus of claim 1 continuing to seek and remove said weeds until 1) a timer in said central processing unit has reached a preprogrammed time set by the user; or, 2) weeds are not encountered for an interval of time programmed by the user; or 3) said central processing unit detects a failure in any of said robot's systems; or, 4) the user externally intervenes and shuts power to said robot.

6. The apparatus of claim 1 further comprising: said boundary of said mulch garden defined by a plurality of magnetic stakes spaced at predetermined intervals and surrounding said boundary of said mulch garden, the spacing calculated to maintain a magnetic field strength which can be detected by a magnetometer mounted on said robot which sends a signal to said programmable central processing unit.

7. The domain boundary system of claim 6 further comprising: magnetic stakes each with a magnet mounted thereon selected from a group consisting of 1) a neodymium permanent magnet; 2) a ceramic ferrite permanent magnet; 3) a rare earth permanent magnet; and 4) a direct current electromagnet.

8. The apparatus of claim 7 where the polarization axis of said magnet is vertical and parallel to the longitudinal axis of said stakes.

9. The apparatus of claim 1 further comprising: said collision avoidance system selected from a group consisting of: 1) an ultrasonic range sensor; 2) a radar range sensor; and 3) a laser range sensor.

10. The apparatus of claim 1 further comprising: said machine vision weed detector having a vision sensor mounted on the front of said robot and focused on the ground with a field of view located at a fixed distance ahead of said robot; said vision sensor capable of transmitting color data to the machine vision weed detector which thereupon conveys said color data to said central processing unit for calculations and analysis.

11. The apparatus of claim 10 wherein said vision sensor is a camera.

12. The apparatus of claim 10 wherein said field of view is illuminated by a lamp mounted on said robot.

13. The apparatus of claim 10 wherein said color data is digitized by a color system selected from a group consisting of: 1) Cyan, Magenta, and Yellow (CMY) and 2) Cyan, Magenta, Yellow and Black (CMYK) as an alternative to the RGB System.

14. The apparatus of claim 13 wherein said color data is digitized by the Red-Green-Blue (RGB) color system and determining the presence of a weed by means of Criterion #1 such that a single pixel in the pixel array has a Green Fraction (GF) having a value greater than or equal to 0.40.

15. The apparatus of claim 14 having the supplemental Criterion #2 means for better weed identification supplementing Criterion #1 means by having said central processing unit identifying the presence of one or a plurality of weeds by reducing the resolution of the images in said defined field of view by calculating the GF of each of the pixels, blackening all pixels having a GF below a user specified value, counting the number of pixels of GF equal to or higher than 0.40 and determining if they exceed a user specified number of pixels characteristic of the size of a weed, and calculating the location of the centroid of all pixels having a GF equal to or higher than 0.40 to identify position of said weed relative to said robot; and, issuing commands to said propulsion module to locate said robot in a position for extraction of said weeds.

16. The apparatus of claim 15 having the further improved supplemental Criterion #3 means for better weed identification by further supplementing Criterion #1 means and Criterion #2 means by determining the Green Pixel Density (GPD) of said pixels having a GF greater than or equal to 0.40 within said field of view as a yet further criterion for determining if said weed is present by subdividing the field of view into blocks and instructing said central processing unit to calculate the GPD within each block, and determining if any one of the reduced number of blocks had a GPD greater than a user specified criterion for the presence of a weed which is representative of the type and size of the weeds being sought.

17. The apparatus of claim 1 wherein said weed extraction module for removing said weeds from said mulch garden is selected from a group consisting of: 1) grabber claws; 2) screw augers; 3) scrapers; 4) electric arcs; 5) lasers; and 6) sprays of herbicides.

18. The apparatus of claim 17 where said central processing units sends commands to said grabber claws to elevate and engage said grabber claws with the weed, and to open and close said grabber claws which are energized by two respective servo motors.

19. The apparatus of claim 1 where said weeds removed from said mulch garden are transported from said weed extraction module to a receptacle by means of a suction tube energized by a blower and activated by said central processing unit.

20. A method for weed detecting and weed removal for a mulch garden having a user pre-defined closed boundary comprising:
  activating an autonomous terrestrially mobile robot including a propulsion module for controlling the trajectory of said robot; and,
  electrically connecting and mounting to said programmable central processing unit (CPU) for issuing positioning commands to said robot, issuing commands for weed extraction, and receiving inputs from a plurality of sensors, and performing calculations to generate said commands; and,
  providing an electrical power supply mounted on said robot to provide power to said propulsion module and to energize said central processing unit and said sensors; and
  providing a domain boundary detection system to define the outside boundary of said mulch garden and confine the trajectory of said robot to within said boundary by signaling said CPU to produce robot command signals to cause said robot's trajectory to reflect from said domain boundary at a pre-defined angle followed by a continued linear trajectory until approaching a different location proximate to said boundary thereby continuing said reflective randomization protocol of said trajectory; and, providing a collision avoidance system for preventing interactions between said robot and obstacles present within said mulch garden, said collision avoidance system producing robot command signals to said CPU to invoke the reflective randomization protocol of said trajectory; and, providing a machine vision weed detector for capturing images of a defined field of view within said mulch garden and identifying the presence of one or a plurality of weeds; and, providing a weed extraction module for removing said weeds from said mulch garden.

* * * * *